(12) United States Patent
Ohara

(10) Patent No.: US 7,072,060 B2
(45) Date of Patent: Jul. 4, 2006

(54) PRINT CONTROL APPARATUS, PRINT CONTROL METHOD, AND MEMORY MEDIUM

(75) Inventor: Eiji Ohara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 854 days.

(21) Appl. No.: 09/758,346

(22) Filed: Jan. 12, 2001

(65) Prior Publication Data

US 2002/0071138 A1 Jun. 13, 2002

(30) Foreign Application Priority Data

Jan. 20, 2000 (JP) .............................. 2000-011723

(51) Int. Cl.
*G06F 3/12* (2006.01)
*G06K 9/36* (2006.01)

(52) U.S. Cl. ...................... 358/1.15; 358/1.16; 710/68; 382/232

(58) Field of Classification Search ............... 358/1.15, 358/1.16, 1.11, 1.13, 414, 518, 426.13, 426.15, 358/426.16, 426.14, 426.04, 470; 345/667, 345/501; 710/68; 382/232, 245, 250, 233, 382/239

See application file for complete search history.

(56) References Cited

U.S. PATENT DOCUMENTS

| | | | | |
|---|---|---|---|---|
| 5,479,587 A | * | 12/1995 | Campbell et al. | 358/1.17 |
| 5,850,504 A | * | 12/1998 | Cooper et al. | 358/1.18 |
| 5,903,715 A | * | 5/1999 | Sawano | 358/1.15 |
| 5,982,937 A | * | 11/1999 | Accad | 382/239 |
| 5,999,710 A | * | 12/1999 | Smith et al. | 358/1.15 |

OTHER PUBLICATIONS

Microsoft Press Computer Dictionary, 2002, Microsoft Press, Fifth Edition, p. 319.*

* cited by examiner

*Primary Examiner*—King Y. Poon
*Assistant Examiner*—Lucas Divine
(74) *Attorney, Agent, or Firm*—Fitzpatrick, Cella, Harper & Scinto

(57) ABSTRACT

To avoid difficulties upon the outputting of data whose amount exceeds the capacity of a memory, without risking image quality degradation and without the need for using a particularly large memory, the system upon receiving first data from a host, generates therefrom second data that can be outputted from an image output apparatus. The second data is subjected to compression to produce third or fourth data (depending on what kind of compression is used) and, based on analysis of system information that is obtained from the host side, the third or fourth data is outputted to the host side. That data is subjected to decompression of a type that is suitable in view of the compression used, thus producing fifth or sixth data, which is outputted to the image output apparatus.

32 Claims, 16 Drawing Sheets

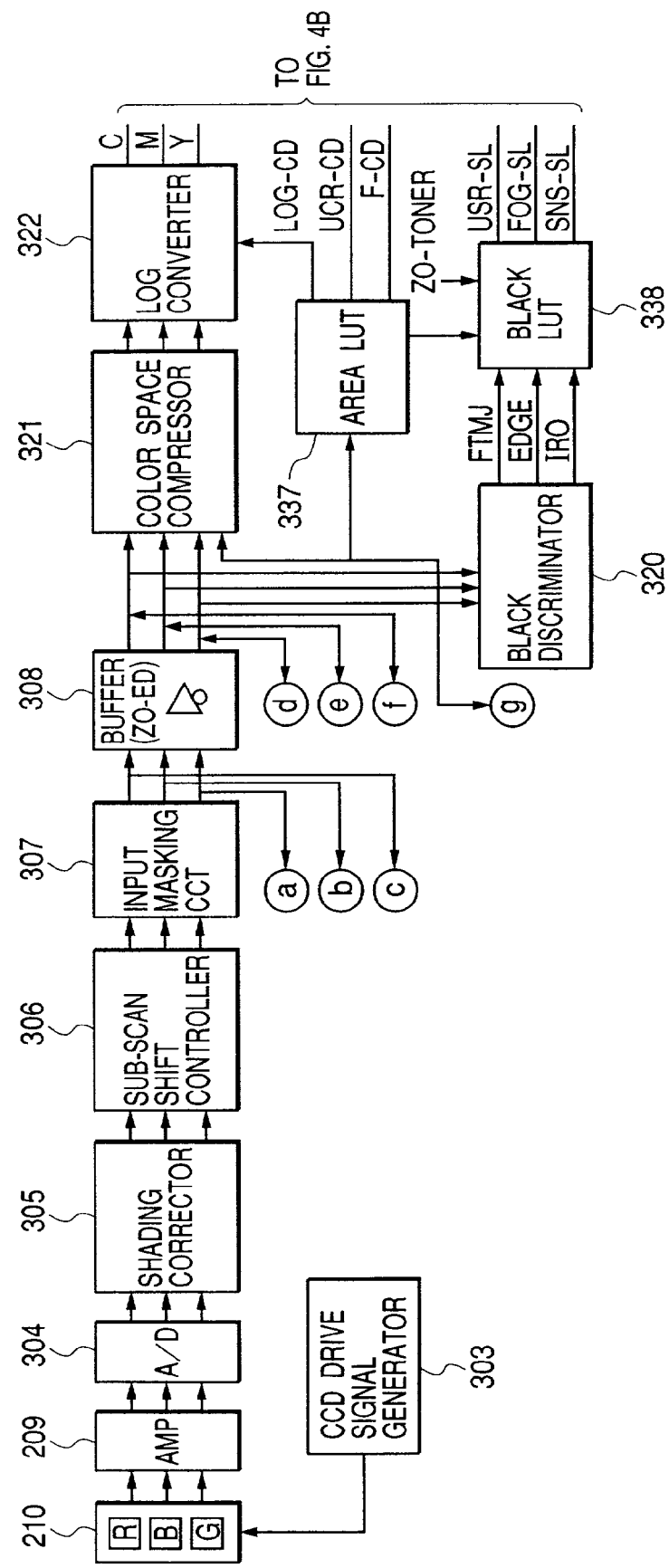

PRINT CONTROL APPARATUS, PRINT CONTROL METHOD, AND MEMORY MEDIUM

BACKGROUND OF THE INVENTION

1. Field of the Invention

The invention relates to a print control apparatus which can communicate with a host computer and an image output apparatus and to a print control method and a memory medium.

2. Related Background Art

FIG. 16 is a block diagram showing an example of a data processing system is to which such a print control apparatus can be applied.

In the case where data of a host computer is printed from an output apparatus such as a color copier or the like of an electrophotographic system, as shown in FIG. 16, the system needs a printer controller 1302 for receiving code data such as a page description language (PDL) or the like which is sent from the host computer 1301, generating page information comprising dot data (bit map data) on the basis of a command shown by the code data, and sequentially transmitting the dot data to a color copier 1303.

The printer controller 1302 is constructed of: a PDL circuit for converting the page description language sent from the host computer 1301 into the dot data; a bit map memory for storing the dot data converted by the PDL circuit; and a data transmitter for transmitting the data in the bit map memory to the color copier 1303.

In the conventional system, it will be noted that the bit map memory in the printer controller 1302 is necessary, for storing the dot data.

In recent years, the realization of high precision in print output from color copiers and the like has been demanded. Although a method of raising the print resolution of the color copier is considered, for example, in a case of changing the resolution from 400 dpi to 600 dpi, this entails that the bit map memory capacity is at least doubled, so that there is a problem in that the cost increases remarkably.

To solve this problem, there is a method whereby compression (compressing process) is performed on pixel data, the compressed data is stored in the bit map memory, and the data is sequentially transmitted to the color copier while performing decompression (decompressing process). Although the capacity of the bit map memory can be reduced by using such a method, if a highly efficient compression is needed, there is a problem of occurrence of deterioration of the picture quality.

SUMMARY OF THE INVENTION

The invention is made to solve the above problems, and it is an object of the invention to provide a print control apparatus, a print control method, and a memory medium which are constructed as follows. That is, second data which can be outputted from an image output apparatus is generated from first data which is inputted from a host computer. Third data is generated by performing a data compression based on a first compression format on the second data, or fourth data is generated by performing a data compression based on a second compression format different from the first compression format on the second data. System information which is obtained is analyzed. The third or fourth data is outputted to the host computer. Fifth data is generated by performing a data decompression corresponding to the first compression format on the third data which is inputted from the host computer, or sixth data is generated by performing a data decompression corresponding to the second compression format on the fourth data which is inputted from the host computer. The fifth or sixth data is outputted to the image output apparatus. Therefore, even if a situation occurs in which data exceeding the capacity of the memory is outputted, such data is alternately stored in a memory resource of an external apparatus without the need of expanding the memory capacity. Upon outputting, the stored data can be outputted as it is as an image or can be outputted as an image with modifications. This eases the restriction on the amount of data which can be handled, which helps avoid difficulties in the printing process due to a lack of memory capacity, and creates a print processing environment which can freely cope with an output request from the user. A compression is performed on dot data which is stored in a memory of the host computer and the compressed data is stored. The compressed data is decompressed and, thereafter, the decompressed data is transmitted to the image output apparatus. Therefore, the necessary memory capacity can be further reduced. Moreover, a selection of the data compression format is determined on the basis of the memory capacity or the like of the host computer which is obtained. Therefore, deterioration of an image due to the image compression can be avoided or mitigated.

According to an embodiment of the invention, there is provided a print control apparatus which can communicate with a host computer (host CPU 105 shown in FIG. 2) and an image output apparatus, comprising: obtaining means (for example, corresponding to a data controller 108 shown in FIG. 2) for obtaining system information from the host computer; data generating means (for example, corresponding to a PDL circuit 111 shown in FIG. 2) for generating second data which can be outputted from the image output apparatus from first data which is inputted from the host computer; first data compressing means (for example, corresponding to a first data compressor 113 shown in FIG. 2) for generating third data by performing a data compression based on a first compression format to the second data; second data compressing means (for example, corresponding to a second data compressor 115 shown in FIG. 2) for generating fourth data by performing a data compression based on a second compression format different from the first compression format to the second data; first output means (for example, corresponding to the data controller 108 shown in FIG. 2) for analyzing the system information which is obtained by the obtaining means and outputting the third or fourth data to the host computer; first data decompressing means (for example, corresponding to a first data decompressor 114 shown in FIG. 2) for generating fifth data by performing a data decompression corresponding to the first compression format to the third data which is inputted from the host computer; second data decompressing means (for example, corresponding to a second data decompressor 116 shown in FIG. 2) for generating sixth data by performing a data decompression corresponding to the second compression format to the fourth data which is inputted from the host computer; and second output means (for example, corresponding to the data controller 108 shown in FIG. 2) for outputting the fifth or sixth data to the image output apparatus.

The above and other objects and features of the present invention will become apparent from the following detailed description and the appended claims with reference to the accompanying drawings.

DETAILED DESCRIPTION OF THE PREFERRED EMBODIMENTS

First Embodiment

Figure 1:
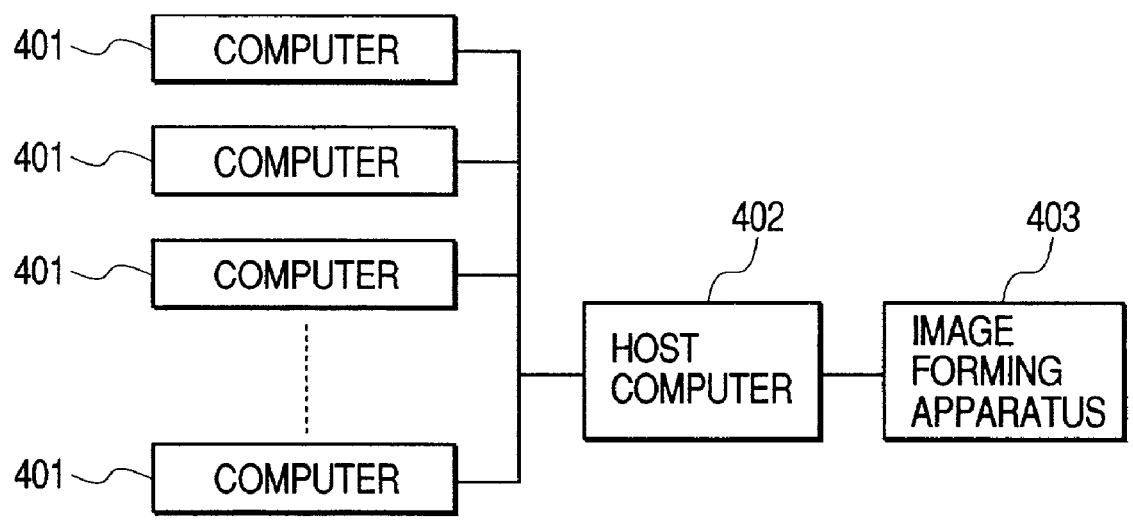
FIG. 1 is a block diagram showing an example of a data processing system showing the first embodiment of the invention to which a print control apparatus can be applied.

FIG. 1 is a block diagram showing an example of a data processing system showing the first embodiment of the invention to which a print control apparatus can be applied. For example, FIG. 1 corresponds to a case where a plurality of computers 401 are connected so that they can communicate with a host computer 402 by a predetermined protocol through a communication medium such as a LAN or the like.

In the diagram, reference numeral 403 denotes an image forming apparatus connected to the host computer 402 by a dedicated interface. In this embodiment, the printer controller for generating dot data from a page description language is stored in the host computer 402.

It is assumed that a color copier for forming a color image by toners of four colors of C, M, Y, and K is connected as an image forming apparatus 403.

Figure 2:
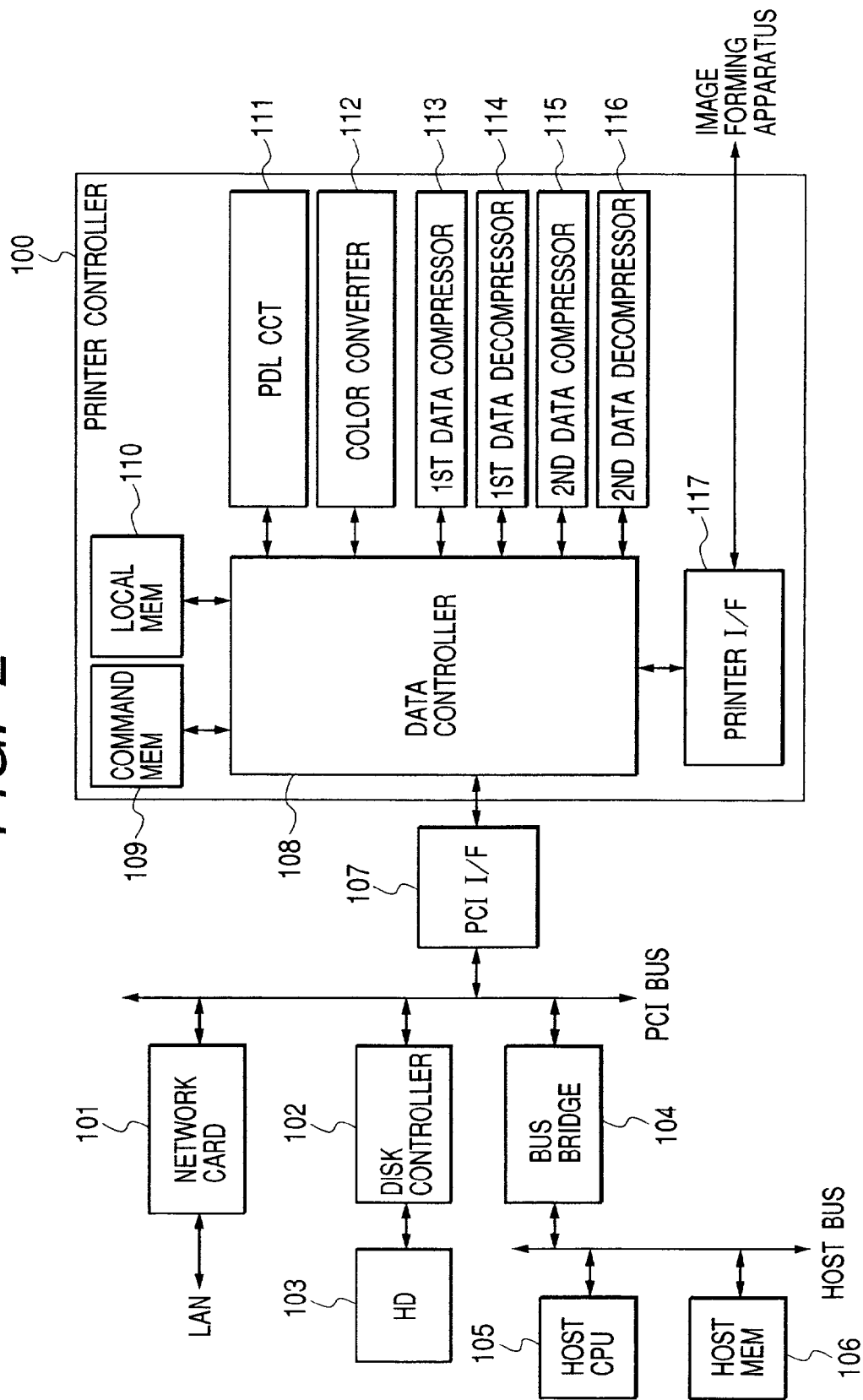
FIG. 2 is a block diagram for explaining a construction of a host computer shown in FIG. 1.

FIG. 2 is a block diagram for explaining a construction of the host computer 402 shown in FIG. 1.

In FIG. 2, reference numeral 100 denotes a printer controller which can communicate with various devices through, for example, a PCI I/F 107 and a PCI bus.

Reference numeral 101 denotes a network card for performing transmission and reception of data between computers connected by the LAN in accordance with a predetermined protocol. A similar network card is also connected to each of the computers connected by the LAN. Besides signal lines for transmitting and receiving data, the following various signals are inputted or outputted to/from the network card: namely, a signal for instructing a computer serving as a transmission partner; a signal for requesting a data transmission; a signal showing that the LAN is being used; a signal showing a fact that the data cannot be received because the computer is in a busy status; and the like. The data is controlled so that the data transmission and reception are performed by transmitting and receiving the above signals between the network cards.

Since the transfer speed and the construction of the signal lines of the PCI bus to which the network card 101 has been connected in the computer are different from those of the LAN connecting the computers, the network card 101 also performs a format conversion between the LAN and the PCI bus.

Reference numeral 102 denotes a disk controller for controlling the data transmission and reception between a hard disk 103 and each device.

Specifically speaking, when a certain device accesses the hard disk 103 through the PCI bus, if another device has already been transmitting or receiving data to/from the hard disk or when the hard disk is in a state where the data cannot be transmitted and received, or the like, the disk controller makes a control so as to issue a wait signal to the device until a time when the hard disk can be accessed.

Reference numeral 103 denotes the hard disk on which applications to be made operative on the computer, documents made by the applications, system files (including the OS or the like) for making the computer operative, various setting files, and the like have been stored. Those files can be made operative on the computer by being transmitted to a host memory 106 and developed.

Reference numeral 104 denotes a bus bridge for connecting a host bus to which fundamental functions of the computer such as host CPU, host memory, and the like have been connected and the PCI bus for sequentially adding necessary functions.

Hitherto, although the devices of the computer have been connected by the same bus, the computer is provided with a plurality of buses in order to allow the devices to exist efficiently mixedly by connecting the devices of the high operating speeds by using another bus, or the like. The transmission and reception of the data between the buses are performed by using the bus bridge 104.

Reference numeral 105 denotes a host CPU for processing and executing the programs stored in the host memory 106 and performing a management of the devices, a control of interruption, and the like. The host memory 106 stores the programs which are executed in the host CPU 105 and data.

The applications, documents, image data, and the like stored in the hard disk 103 are developed in the host memory 106, so that commands, an edition of data, and the like by the host CPU 105 are executed.

Further, a volatile RAM is generally used as the host memory 106. If a power source of the computer is turned off, the data on the host memory is deleted.

Therefore, when the processes and the data editing by the host CPU 105 are finished, the data is stored in a memory media such as hard disk 103, floppy disk, etc.

Memory capacity can be added by exchanging or expanding a memory chip of the host memory 106. Information (memory map) such as capacity of the installed memory, capacity of a free portion, and the like is managed by the host CPU 105.

Reference numeral 107 denotes the PCI interface for controlling data transmission and reception between a data controller 108 and the PCI I/F 107 in accordance with commands which are generated by the host CPU 105 and a command memory 109.

Reference numeral 108 denotes the data controller for managing data transmission and reception between the devices in the printer controller 100 in order to perform the printing operation or scanning operation by the color copier connected to the host computer. The data controller 108 analyzes and executes the commands which are generated from the host CPU 105 and command memory 109, thereby managing the data transmission and reception.

In the printer controller 100, reference numeral 109 denotes the command memory for storing the command for controlling each device in the printer controller 100. In the embodiment, in a case of printing by the color copier, a series of commands is previously stored in the command memory 109 and each device executes the command stored in the command memory 109, thereby performing the printing operation.

Reference numeral 110 denotes a local memory for temporarily storing data for executing each process at the time of the printing operation. Reference numeral 111 denotes a PDL circuit. On the computer or between the computers, a document (including not only sentences but also figures, images, and the like) formed by the various applications is translated into a page description language by a device driver program called a printer driver which operates on the computer and the data is transmitted and received.

In the PDL circuit 111, such a page description language is analyzed and developed, thereby generating dot data of three colors of red (R), green (G), and blue (B).

Reference numeral 112 denotes a color converter for performing a predetermined arithmetic operation on the dot data of RGB generated by the PDL circuit 111 or converting the dot data into dot data of cyan (C), magenta (M), yellow (Y), and black (K) components, those being colors of toners which are used for forming an image by the color copier as an image forming apparatus in this embodiment, this conversion being effected by using a conversion table.

In the color converter 112, image processes such as output masking for removing cloud components of colors upon printing, color space compression for converting the dot data into data in a color space which can be expressed by the color copier, and the like are also executed.

Reference numeral 113 denotes a first data compressor for performing a run length compression on the dot data of C, M, Y, and K generated by the color converter 112. In the embodiment, the run length compression is performed color by color of C, M, Y, and K of the color data generated by the color converter 112 and every bit plane. Parameters which are used for the data compression have been preset in the command memory 109. By receiving that information from the command memory 109, the first data compressor 113 performs the run length compression by predetermined parameters.

Reference numeral 114 denotes a first data decompressor for performing a decompression to the data compressed by the first data compressor 113. In a manner similar to the first data compressor 113, the first data decompressor 114 also performs the data decompression by parameters which have been preset in the command memory 109.

Reference numeral 115 denotes a second data compressor for performing a JPEG compression on the dot data of C, M, Y, and K generated by the color converter 112. In this embodiment, the JPEG compression is performed color by color on the data of C, M, Y, and K generated by the color converter 112. Parameters for data compression such as compression ratio and sub-sampling ratio have been preset in the command memory 109.

Receiving that information from the command memory 109, the second data compressor 115 executes the JPEG compression using the predetermined parameters.

Reference numeral 116 denotes a second data decompressor for performing a decompression on the data compressed by the second data compressor 115. In a manner similar to the second data compressor 115, the second data decompressor 116 also executes its data decompression using parameters which have been preset in the command memory 109.

Reference numeral 117 denotes a printer interface by which print data/scan data, an enable signal, a trigger signal, a control signal for performing serial communication, and the like are outputted to the color copier.

Figure 3:
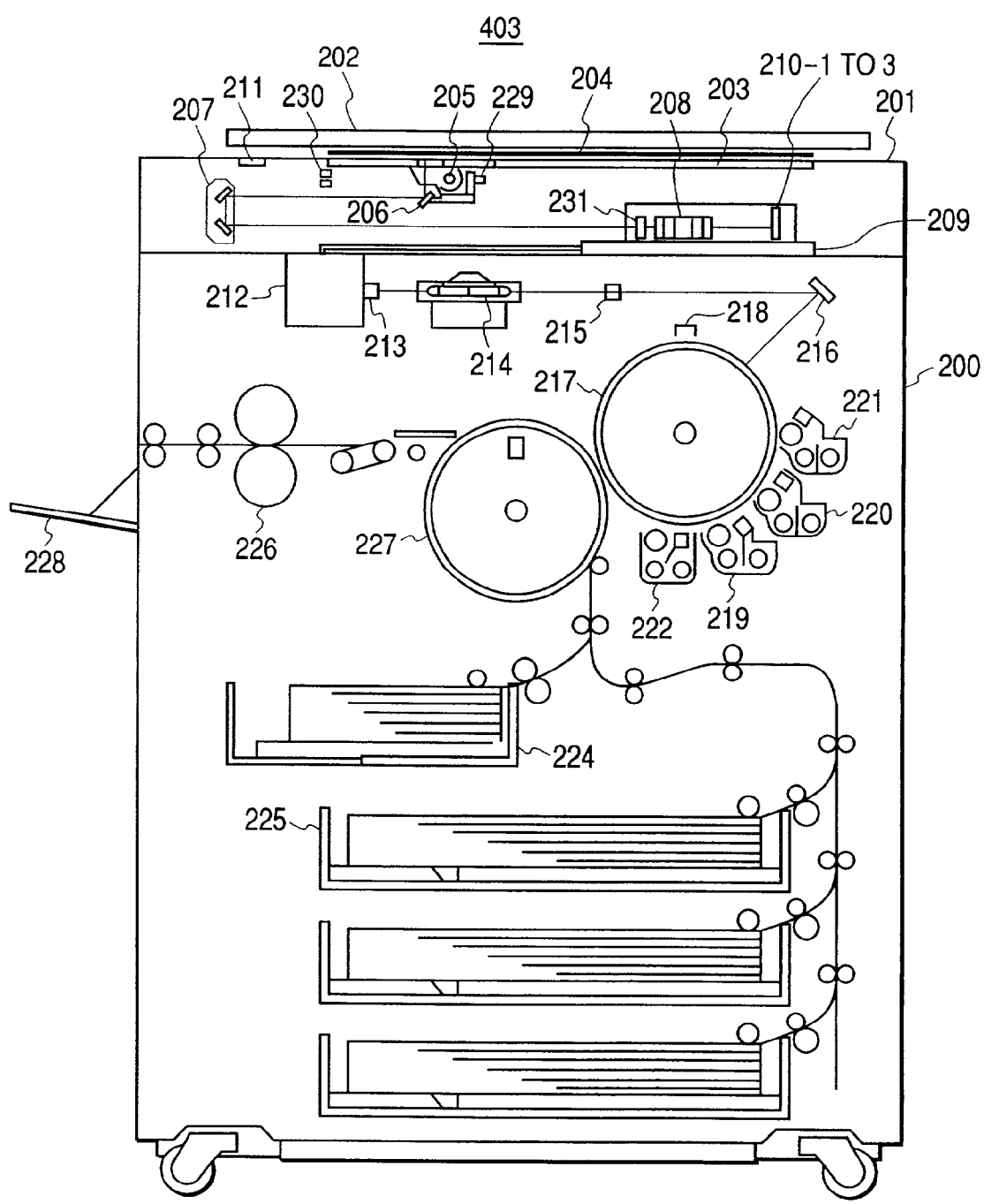
FIG. 3 is a cross-sectional view for explaining a schematic construction of a digital color copier showing an example of an image forming apparatus shown in FIG. 1.

FIG. 3 is a cross-sectional view for explaining a schematic construction of a digital color copier showing an example of the image forming apparatus 403 shown in FIG. 1. The digital color copier in the embodiment has a digital color image reader (reader) 201 in the upper portion and a digital color image printer (printer) 200 in the lower portion.

In the reader 201, reference numeral 204 denotes an original which is put on a glass 203 under a cover 202. When copy start is instructed from an operation unit 211 by a key operation instruction, the original is exposed and scanned by an exposure lamp 205 (sensors 229 and 230 assist in this process), a reflection light image from the original 204 is reflected by mirrors 206 and 207, and thereafter, passes through element 231 and a lens 208. Thus, the reflection light image is converged to full color sensors (3-line CCDs in this embodiment) 210-1 to 210-3, thereby obtaining color separation image signals.

Reference numeral 209 denotes an amplifier for amplifying the color separation image signals and supplying the amplified signals to an image processing unit 212. The color separation image signals inputted to the image processing unit 212 are converted into digital electric signals and, thereafter, subjected to image processes including an editing process. The processed signals are sent to the printer 200.

In the printer 200, the image signal from the reader 201 is converted into a laser beam signal by a laser output unit 213. The laser beam emitted from the laser output unit 213 is reflected by a polygon mirror 214 and projected through optical elements 215 and 216 onto the surface of a photosensitive drum 217. Upon image formation, the photosensitive drum 217 is rotated and uniformly charged by a charging device 218, and a light image is irradiated onto the drum surface separation color by separation color, thereby forming a latent image.

A predetermined one of developers 219 to 222 is made operative, thereby developing the latent image and forming a toner image onto the photosensitive drum 217. Further, the toner image is transferred onto a recording material which was fed from a recording material cassette 224 or 225 to the position which faces the photosensitive drum 217 through a conveying system and a transfer drum 227. In association with the rotation of the transfer drum 227, the toner image on the photosensitive drum 217 is transferred onto the recording material. Color images of the desired number are transferred onto the recording material as mentioned above, so that a full color image is formed.

In a case of forming a full color image, when the transfer of the toner images of four colors is finished as mentioned above, the recording material is peeled off from the transfer drum 227 and ejected onto a tray 228 through a fixing device 226. It is assumed that the transfer drum 227 has a circumferential length which can transfer up to two sheets of recording materials of, for example, the A4 size.

Figure 4B:
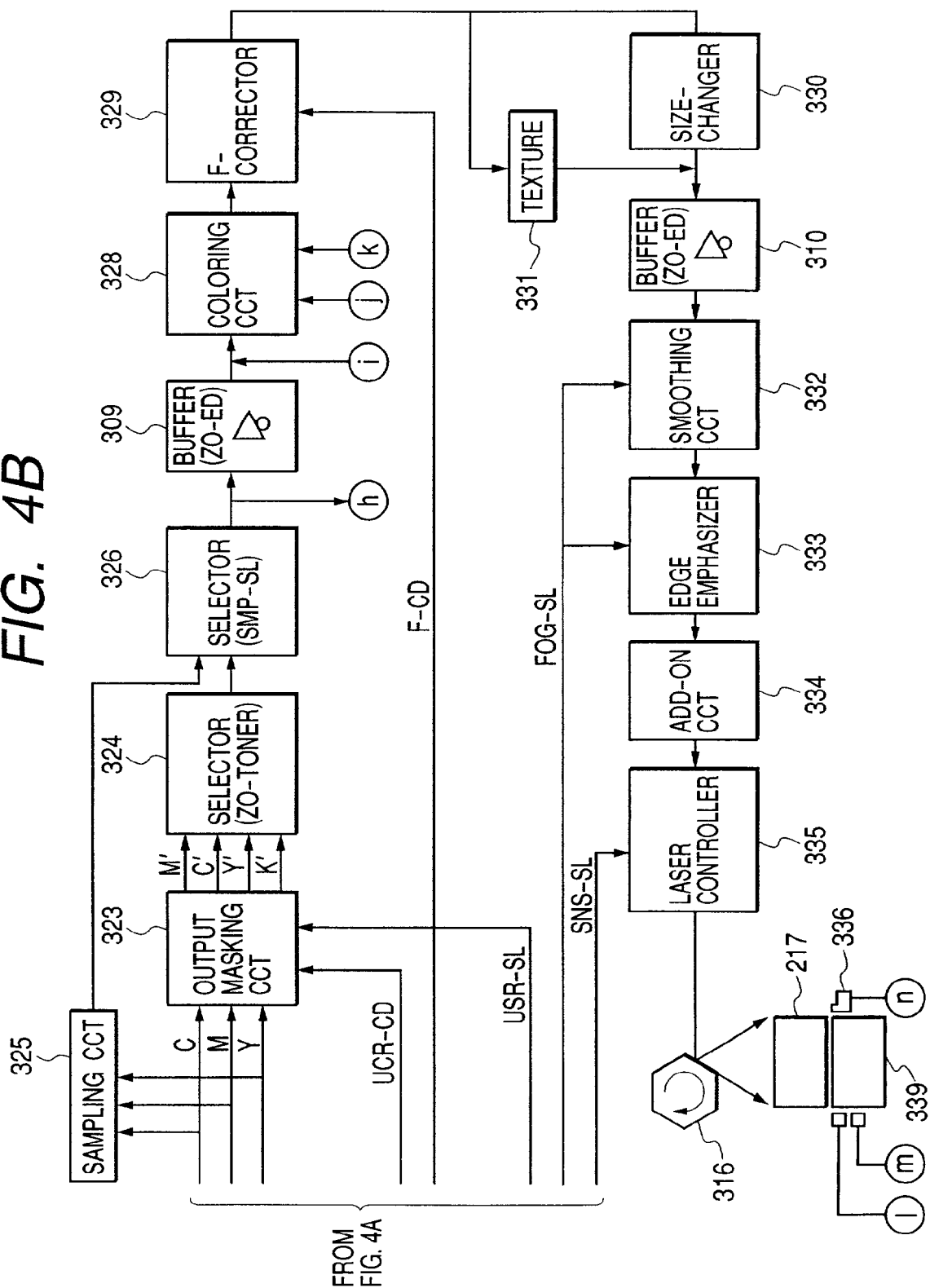
FIG. 4 is composed of FIGS. 4A and 4B, which are block diagrams for explaining a construction of an image processing unit shown in FIG. 3 and its peripheral circuits.
Figure 5:
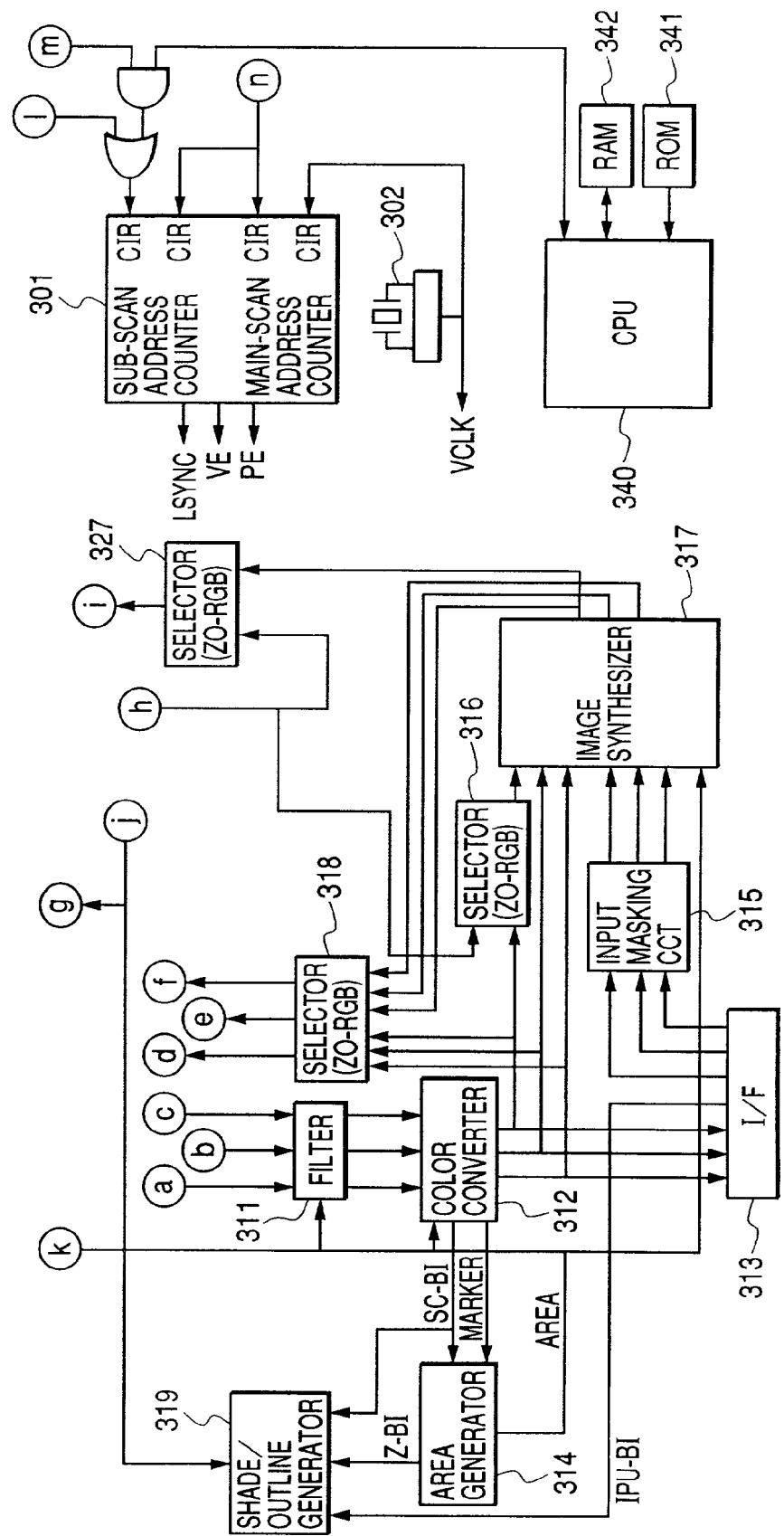
FIG. 5 is a block diagram for explaining a construction of the image processing unit shown in FIG. 3 and its peripheral circuits.

FIGS. 4A, 4B and 5 are block diagrams for explaining constructions of the image processing unit 212 shown in FIG. 3 and its peripheral circuits.

In FIGS. 4A and 4B or 5, a full color sensor (CCD) 210 is constructed by the 3-line CCDs 210-1 to 210-3 that are used to pick up red, green, and blue components, respectively. The full color sensor color separates light information of one line from the original and generates electric signals R, G, and B at a resolution of 400 dpi.

In this embodiment, since an image of up to 297 mm (A4 longitudinal) is read as one line, an image of 4677 pixels per line of each of R, G, and B is outputted from each of the CCDs 210-1 to 210-3.

Reference numeral 301 denotes a sync signal generator comprising a main-scan address counter, a sub-scan address counter, and the like. The main-scan address counter is cleared every line by a BD signal as a sync signal for laser recording of every line onto the photosensitive drum 217, counts the number of VCLK signals from a pixel clock generator 302, and generates a count output H-ADR corresponding to each pixel of the image information of one line which is read out from the CCD 210. The count output H-ADR is up-counted from "0" to "5000" so that the image signal of one line from the CCD 210 can be sufficiently read out.

The sync signal generator 301 generates various timing signals such as line sync signal LSYNC, main-scan valid interval signal VE and sub-scan valid interval signal PE of the image signal, and the like.

Reference numeral 303 denotes a CCD drive signal generator for decoding the address signal H-ADR and generating a set pulse and a CCD-DRIVE signal as a transfer clock from a shift pulse of the CCD 210.

Thus, the color separation image signals of R, G, and B for the same pixel are sequentially outputted from the CCD 210 synchronously with the VCLK signal. Reference numeral 209 denotes the amplifier for amplifying the output signals of the CCD 210, and 304 indicates an A/D converter for converting each of the red, green, and blue image signals into an 8-bit digital signal.

Reference numeral 305 denotes a shading corrector for correcting a variation of signal outputs of every pixel in the CCD 210. The shading corrector 305 has a memory of a capacity corresponding to one line of each of the signals R, G, and B, reads an image of a white board having a density which has been predetermined in dependence on the optical system being used, and uses it as a reference signal.

Reference numeral 306 denotes a sub-scan shift controller for absorbing a shift amount which is caused when the image signals read out by the CCD 210 are shifted in the sub-scanning direction by an amount corresponding to 8 lines at a time. Reference numeral 307 denotes an input masking circuit for removing color cloud components of the input signals R, G, and B.

Reference numerals 308, 309, and 310 denote buffers each for allowing the is image signal to pass when a Z0-ED signal is at the L (low) level and inhibiting the passage of the image signal when the Z0-ED signal is at the H (high) level. Usually, the Z0-ED signal is at the H level in the case of using an editing function.

Reference numeral 311 denotes a filter for smoothing the image signal and executing a matrix arithmetic operation of (5×5); and 312 indicates a color converter having a function for converting the image signals of RGB space into HSL color space coordinates, converting previously designated colors into other designated colors, and returning them into the color space of RGB.

The color converter 312 also converts a multivalue signal into binary signals on the basis of a predetermined threshold value and outputs them as a MARKER signal and an SC-BI signal for area processing, which will be explained hereinbelow.

Reference numeral 313 denotes an interface for matching the image signal which is inputted from the outside with a speed of the image process which is executed by the image processing unit. Data outputted from the printer I/F 117 in FIG. 2 is inputted to the I/F 313.

Reference numeral 314 denotes an area generator for generating an area designated by an editor or the like and storing it. The MARKER signal indicative of the extracted image such as a marker pen or the like drawn on the original by the color converter 312 is also stored as an area into the memory. Further, the binary signal SC-BI is used as a binary image signal for a Z-BI output signal.

Reference numeral 315 denotes an input masking circuit for removing color cloud components when the R, G, and B signals are inputted from the external equipment in a manner similar to the input masking circuit 307 for the external image signals inputted from the interface 313.

Reference numeral 316 denotes a selector for outputting an output (R signal) of the color converter 312 when a signal Z0-RGB as a control signal is at the L level and outputting an output (CMYK signal) of a selector 326 when the Z0-RGB signal is at the H level.

Reference numeral 317 denotes an image synthesizer. When the RGB signals are inputted from the I/F 313, the control signal Z0-RGB of the selector 316 is set to the L level. By taking as inputs the RGB signals that are outputs of the color converter 312, the image synthesizer 317 synthesizes the RGB image signals read by the CCD 210 and the RGB image signals inputted from the I/F 313.

When the CMYK signals are inputted from the I/F 313, a chroma signal corresponding to a developing agent which is used at present is inputted by an amount of one page at a time in response to the image signals from the CCD 210. By setting the control signal Z0-RGB of the selector 316 to the H level, the CMYK signals as an output of the selector 326 are inputted and an CMYK synthesis is performed. The image synthesizer 317 can also synthesize the image signals from the CCD 210 and the binary images from the I/F 313.

The area to be synthesized can be designated by an AREA signal from the area generator 314 or can be also designated by a binary signal which is inputted from the I/F 313.

In the above synthesizing process, it is possible to perform: a substitution synthesis for independently synthesizing the image signals from the CCD 210 and the external image signals every area; and a see-through synthesis for synthesizing two images by simultaneously overlaying them so as to enter a see-through state. In the see-through synthesis, a see-through ratio indicating to which extent one of the two images is synthesized in a see-through state can be also designated.

Reference numeral 318 denotes a selector for selecting an output of the image synthesizer 317 in case of using the image synthesizer 317 as an RGB synthesizer (Z0-RGB=L) and selecting the outputs of the color converter 312 in a case of using the image synthesizer 317 as a CMYK synthesizer (Z0-RGB=H).

Reference numeral 319 denotes a shade/outline generator for generating an outline signal and a shade signal with respect to the SC-BI signal obtained by binarizing the image signal read by the CCD 210, the binary signal which is inputted from the I/F 313, or the Z-BI signal as binary data derived from the area generator 314.

Reference numeral 320 denotes a black discriminator for discriminating a feature of the inputted image signal and outputting a character bold signal (bold character degree) FTMJ, an edge signal EDGE, and a chroma signal IRO.

Reference numeral 321 denotes a color space compressor for performing a matrix arithmetic operation on the basis of the following expression (1).

$$\begin{pmatrix} R' \\ G' \\ B' \end{pmatrix} = \begin{pmatrix} R \\ G \\ B \end{pmatrix} + \begin{pmatrix} a11 & a12 & a13 & a14 & a15 & a16 & a17 & a18 \\ a21 & a22 & a23 & a24 & a25 & a26 & a27 & a28 \\ a31 & a32 & a33 & a34 & a35 & a36 & a37 & a38 \end{pmatrix} \times \begin{pmatrix} R-X \\ G-X \\ B-X \\ (R-X) \times (G-X) \\ (G-X) \times (B-X) \\ (B-X) \times (R-X) \\ R \times G \times B \\ (255-R) \times (255-G) \times (255-B) \end{pmatrix}$$

where X: the minimum value of R, G, and B

By presetting a decision about whether the color space compression is performed or not in the color space compressor 321, ON/OFF status of the color space compression can be switched by the area signal AREA. Reference numeral 322 denotes a light amount-density converter (LOG converter) for converting the 8-bit light amount signals of red, green, and blue into 8-bit density signals of cyan (C), magenta (M), and yellow (Y) by logarithmic transformation.

Reference numeral 323 denotes an output masking circuit for executing the well-known masking arithmetic operation such that a density signal of black is extracted from the density signals of three colors of C, M, and Y, and a color cloud component of the developing agent corresponding to each density signal is removed by the well-known UCR process (undercolor removing process).

The signal of the color corresponding to the developing agent which is used at present is selected by a selector 324 from density signals M', C', Y', and K' generated as mentioned above. A Z0-TONER signal is a 2-bit signal which is generated from a CPU 340 for the purpose of such a color selection. When the Z0-TONER signal is equal to "0", the density signal M' is outputted. When the Z0-TONER signal is equal to "1", the density signal C' is outputted. When the Z0-TONER signal is equal to "2", the density signal Y' is outputted. When the Z0-TONER signal is equal to "3", the density signal K' is outputted.

Reference numeral 325 denotes a sampling circuit for sampling the inputted image signals R, G, and B and a density signal ND formed from the R, G, and B signals every four pixels and serially outputting the sampled signals as R, G, B, and ND signals. It is assumed that the density signal ND is expressed by, for example, (R+G+B)/3.

Reference numeral 326 denotes the selector for selecting outputs (density signals M', C', Y', and K') of the output masking circuit 323 when an SMP-SL signal is set to the L level by the CPU 340 and selecting outputs of the sampling circuit 325 when the SMP-SL signal is set to the H level.

Reference numeral 327 denotes a selector for selecting the output of the image synthesizer 317 in case of using the image synthesizer 317 as a CMYK synthesizer (Z0-RGB=H), selecting an output of the selector 326 in a case of using the image synthesizer 317 as an RGB synthesizer (Z0-RGB=L), and sending the selected output to the post stage.

Reference numeral 328 denotes a coloring circuit for performing a process such that a preset color is added to, for example, a black and white image, or the like. The coloring circuit 328 also performs a process for coloring the binary signal inputted from the I/F 313 and a process for coloring a character/shade/outline signal generated by the shade/outline generator 319. Further, a gradation pattern such that a gradation gradually changes can be also formed.

Reference numeral 329 denotes an F-corrector for performing a gamma process according to developing characteristics of the printer 200. The F-corrector can also set a density for each mode.

Reference numeral 330 denotes a size-changer which has a memory of a capacity as much as one line of the image signal and executes a process for enlarging or reducing the image signal in the main-scanning direction, an oblique body process for inclining the image and outputting, or the like. Upon sampling, sampling data is stored in the memory and used for forming a histogram.

Reference numeral 331 denotes a texture for synthesizing a pattern obtained by binarizing the image signal which has preliminarily read by the CCD 210 or a binary pattern inputted from the external apparatus to the color image signal read by the CCD 210 and outputting a synthesized signal. Reference numeral 332 denotes a smoothing circuit comprising (5×5) filters; and 333 indicates an edge emphasizer comprising (5×5) filters.

Reference numeral 334 denotes an add-on circuit for outputting the image signal as a specific coded pattern; 335 indicates a laser controller for controlling a light emission amount of the laser beam in accordance with a VIDEO signal. The laser beam is scanned in the axial direction of the photosensitive drum 217 by the polygon mirror 214, thereby forming an electrostatic latent image of one line onto the photosensitive drum.

Reference numeral 336 denotes a photodetector provided near the photosensitive drum 217. The photodetector 336 detects the passage of the laser beam just before the photosensitive drum 217 is scanned and generates the sync signal BD of one line.

Reference numeral 337 denotes an area LUT (Look-Up Table) for setting each mode in accordance with the AREA signal from the area generator 314. An LOG-CD signal as an output of the area LUT 337 is used for switching an LOG table of the LOG converter 322 to a through setting or the like. A UCR-CD signal is used for allowing the output masking circuit 323 to perform a trimming or masking. An F-CD signal is used for changing a magnitude of an F value in the F-corrector 329.

Reference numeral 338 denotes a black LUT which is used for performing various processes on the basis of an output of the black discriminator 320. For example, a UCR-SL signal is used for performing processes such that a UCR amount of the output masking circuit 323 is changed and with respect to an area determined to be a black character, the amount of black toner is further increased and amounts of toners of C, M, and Y are further decreased, thereby developing the images, and the like.

An EDGE-SL signal is used for setting so as to switch the filters to a filter such that an edge portion is emphasized more in an area of a blacker character in the smoothing circuit 332 and edge emphasizer 333. Further, an SNS-SL signal is used for switching the number of lines per inch between 400 lines and 200 lines of the PWM control in the laser controller 335 on the basis of an output of the black LUT 338. That is, in the area determined to be a black character, the development is performed by 400 lines in order to raise the resolution. In the other image areas, the development is performed by 200 lines in order to raise the gradation.

Reference numeral 339 denotes a photosensor which, when detecting that the transfer drum 227 has reached a predetermined position, generates a page sync signal ITOP, initializes a sub-scan address counter of the sync signal generator 301, and supplies the ITOP signal to the CPU. Reference numeral 340 denotes the CPU for controlling the image reading operation and the image recording operation.

Reference numeral 341 denotes a ROM in which programs which are used in the CPU 340 and predetermined set values have been stored, and 342 indicates a RAM in which data is temporarily stored or newly set values and the like have been stored.

Figure 6:
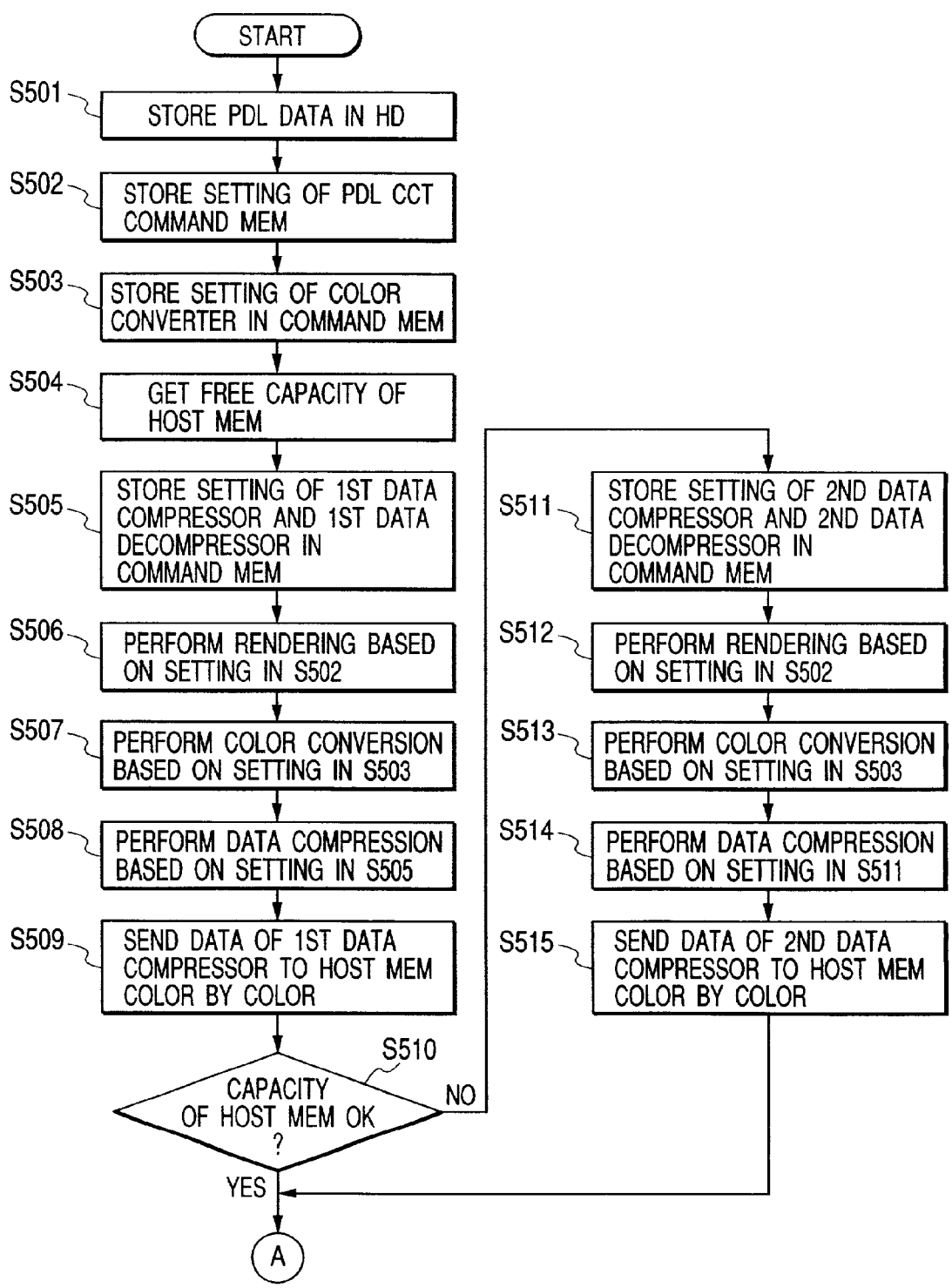
FIG. 6 is a flowchart showing an example of a first data processing procedure in the print control apparatus according to the invention.
Figure 7:
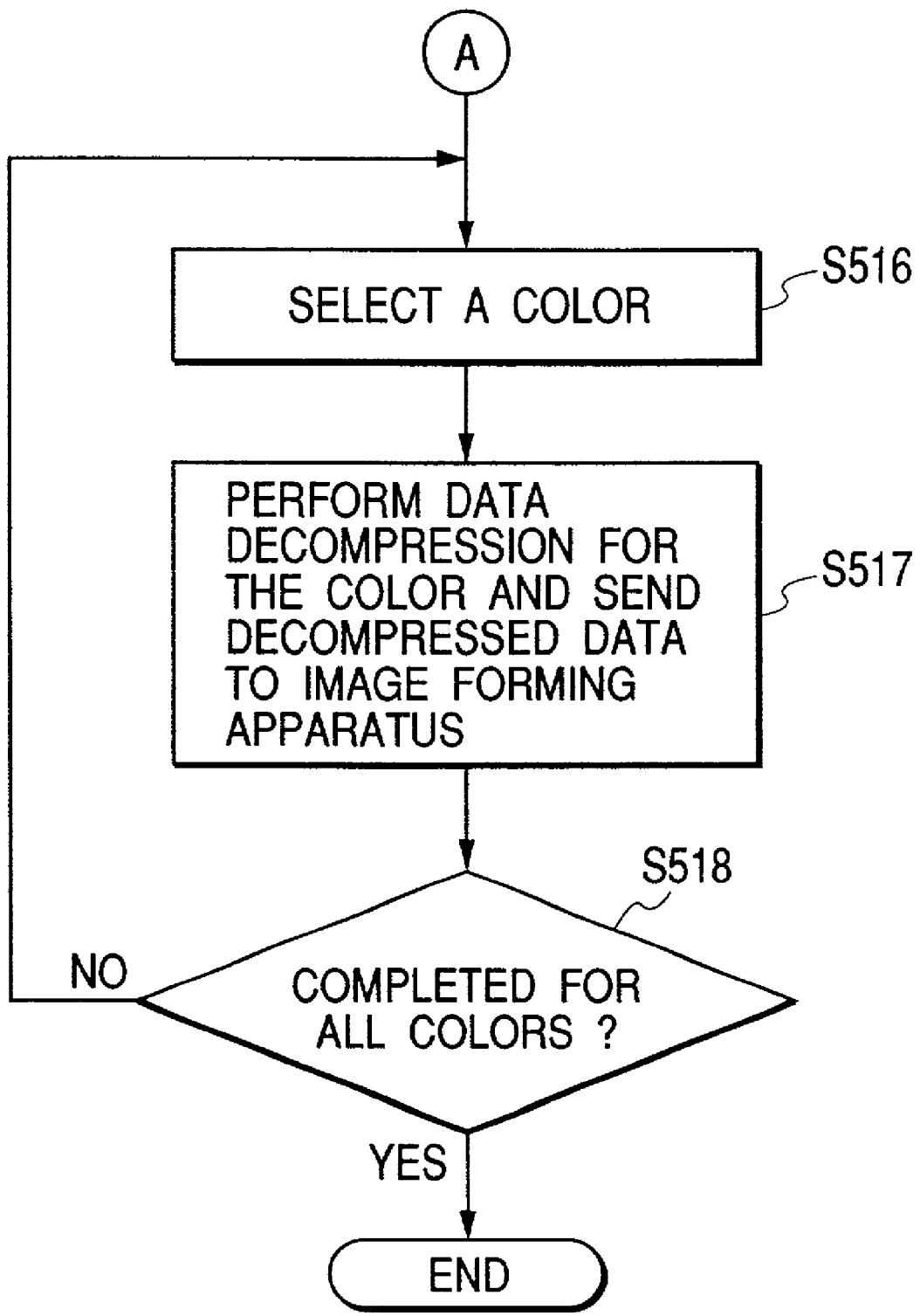
FIG. 7 is a flowchart showing an example of the first data processing procedure in the print control apparatus according to the invention.

FIGS. 6 and 7 are flowcharts showing an example of a first data processing procedure in the print control apparatus according to the invention, and the flow corresponds to a data processing procedure of the host computer which is executed for a time interval during which the color image data of the computer 401 is printed by the color copier. S501 to S518 denote processing steps. For simplicity of explanation, in FIG. 6, the printing operation of image data corresponding to one page of recording paper will be described.

FIGS. 8 to 12 are block diagrams for explaining a data processing state at each phase in the printer controller 100 shown in FIG. 2, and the same component elements as those in FIG. 2 are designated by the same reference numerals.

First, PDL data written by the page description language is transmitted from the computer 401 to the host computer 402 through the LAN. The host computer 402 stores the transmitted PDL data into the hard disk 103 (step S501). When the PDL data is stored in the hard disk 103 as mentioned above, the host CPU 105 stores setting for performing a rendering process by the PDL circuit 111 into the command memory 109 (step S502) and, thereafter, similarly stores setting for performing a color conversion by the color converter 112 into the command memory 109 (step S503).

Subsequently, the host CPU 105 obtains a capacity of the free portion in the host memory 106 (step S504) and, thereafter, stores setting for performing a compression or decompression by the first data compressor 113 or the first data decompressor 114 (step S505).

When all of the settings and parameters for outputting the data to the color copier are set into the command memory 109 as mentioned above, the command memory 109 starts to control each device of the printer controller 100 on the basis of the stored commands and settings and first executes the rendering process by the PDL circuit 111 (step S506).

Figure 8:
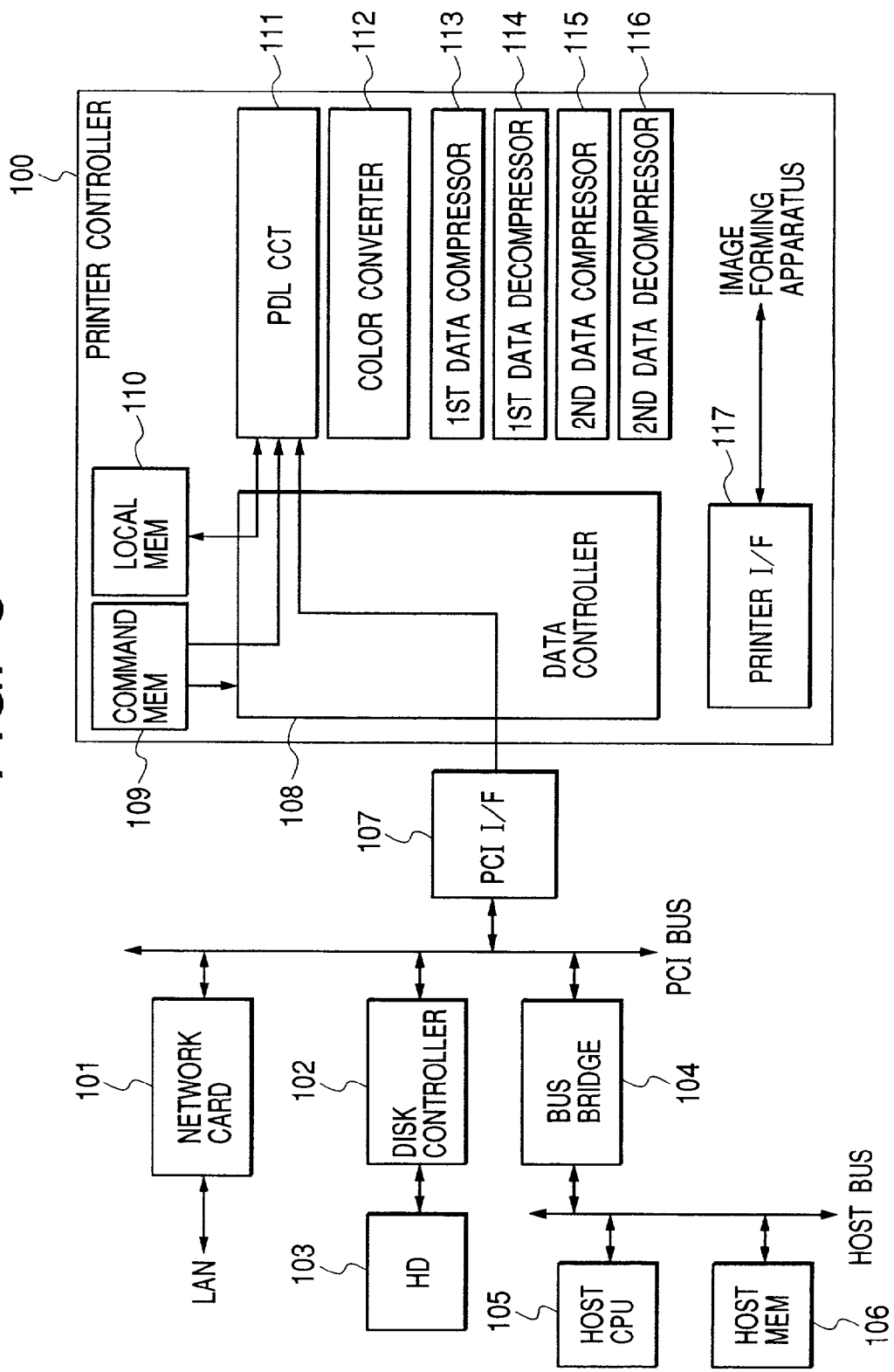
FIG. 8 is a block diagram for explaining a data processing state at each phase in a printer controller shown in FIG. 2.

FIG. 8 shows a state where the rendering process is performed by the PDL circuit 111 in the printer controller 100. In FIG. 8, the data controller 108 connects the PCI I/F 107 to the PDL circuit 111, the command memory 109 to the PDL circuit 111, and the local memory 110 to the PDL circuit 111 in response to outputs which are outputted from the command memory 109, respectively.

The PDL circuit 111 receives the page description language stored in the hard disk 103 and converts it into RGB dot data in accordance with the commands and settings in the command memory 109. The local memory 110 is used as a buffer memory for temporarily storing data at the time of data conversion.

When the conversion into the RGB raster image data is finished by the PDL circuit 111 as mentioned above, the command memory 109 executes the color conversion by the color converter 112 (step S507).

Figure 9:
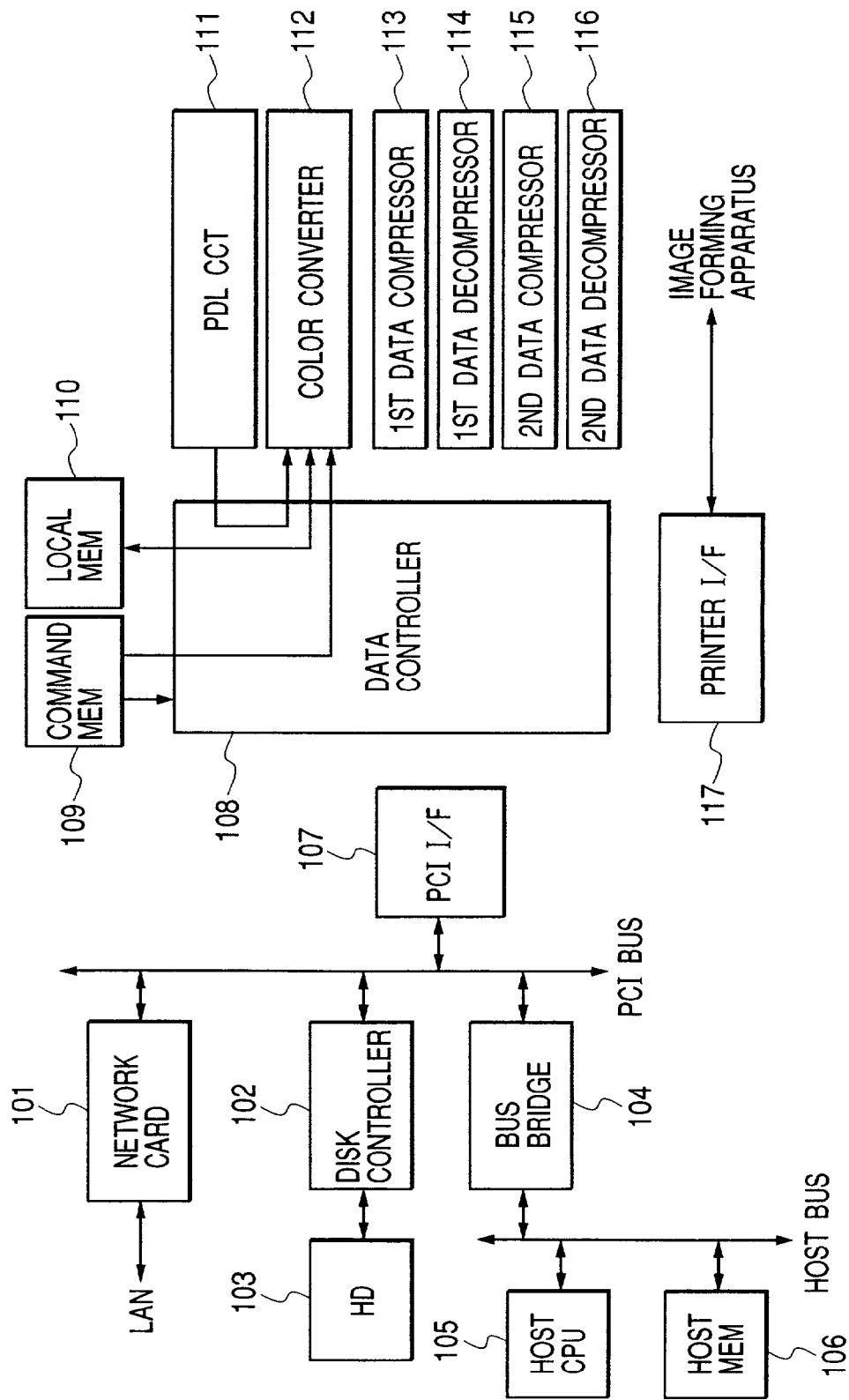
FIG. 9 is a block diagram for explaining a data processing state at each phase in the printer controller shown in FIG. 2.

FIG. 9 shows a state where the process for converting the dot data expressed by RGB into CMYK dot data by the color converter 112 is performed. In FIG. 9, the data controller 108 connects the PDL circuit 111 to the color converter 112, the command memory 109 to the color converter 112, and the local memory 110 to the color converter 112 by commands which are outputted from the command memory 109, respectively.

The color converter 112 obtains the RGB dot data stored in the PDL circuit 111 and color converts it into the CMYK dot data in accordance with commands and setting in the command memory 109. The local memory 110 is used as a buffer memory for temporarily storing data at the time of the color conversion.

When the conversion into the CMYK raster image data by the color converter 112 is finished, the command memory 109 subsequently executes a compression on the basis of the parameters set in step S505 by the first data compressor 113 (step S508).

Figure 10:
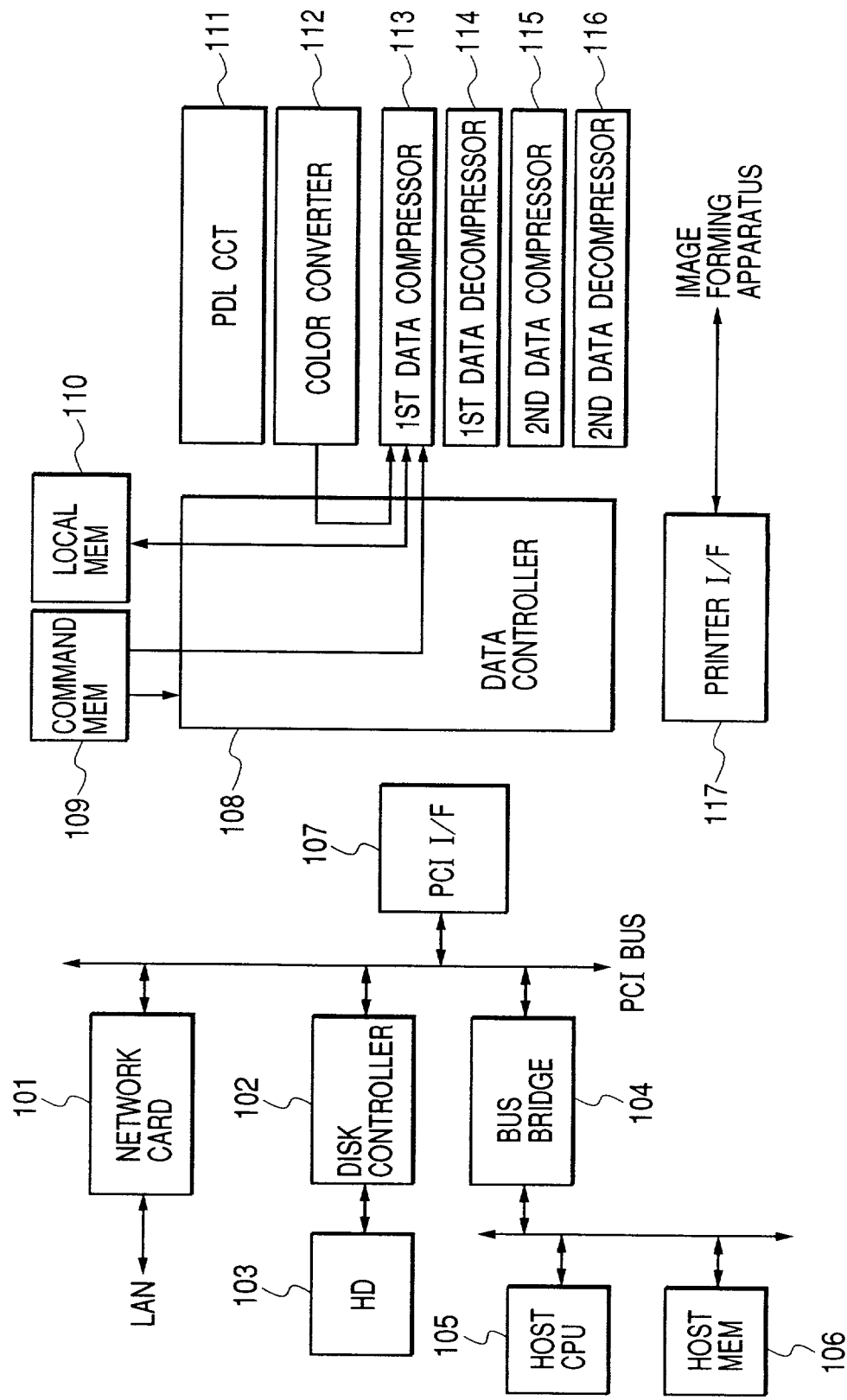
FIG. 10 is a block diagram for explaining a data processing state at each phase in the printer controller shown in FIG. 2.

FIG. 10 shows a state where a run-length compression (as a type of reversible compression) is performed on the CMYK dot data color by color by the first data compressor 113. In FIG. 10, the data controller 108 connects the color converter 112 to the first data compressor 113, the command memory 109 to the first data compressor 113, and the local memory 110 to the first data compressor 113 in accordance with commands which are outputted from the command memory 109, respectively.

The first data compressor 113 obtains the CMYK dot data stored in the color converter 112 in accordance with the commands and setting in the command memory 109 and performs the run length compression color by color. The local memory 110 is used as a buffer memory for the run length compression.

While the run length compression of the CMYK dot data is being performed by the first data compressor 113, the command memory 109 subsequently transfers the data in the first data compressor 113 to the host memory 106 color by color (step S509).

Figure 11:
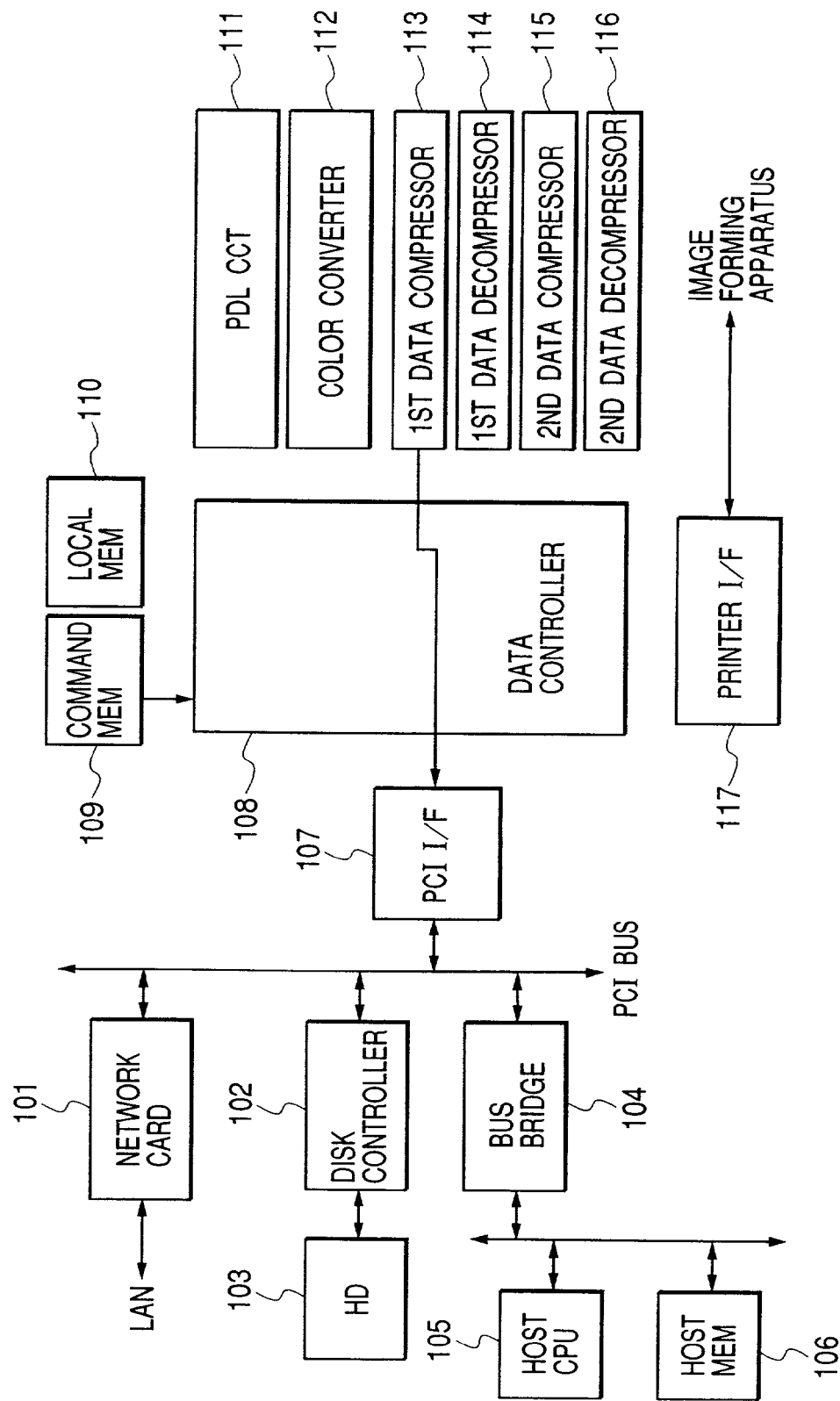
FIG. 11 is a block diagram for explaining a data processing state at each phase in the printer controller shown in FIG. 2.

FIG. 11 shows a state where the data in the first data compressor 113 is transferred to the host memory 106 color by color. In FIG. 11, the data controller 108 connects the first data compressor 113 to the PCI I/F 107 by a command which is outputted from the command memory 109. The data outputted from the first data compressor 113 is sequentially stored in the host memory 106.

In step S510, whether an amount of data that is sequentially stored in the host memory 106 in step S509 does not exceed the free capacity of the host memory 106 obtained in step S504 or not is monitored and discriminated by the host CPU 105. If it is determined that the data amount does not exceed the free capacity of the host memory 106, all of the data outputted from the first data compressor 113 is stored in the host memory 106. However, if it is decided that the data amount exceeds the free capacity of the host memory 106, the run-length compression by the first data compressor 113 is immediately stopped, and the process is switched to the compression by the second data compressor 115 in step S511 and subsequent steps.

In the second data compressor 115, JPEG compression (as a compressing means whose efficiency is higher than that of the run-length compression performed by the first data compressor 113) is executed. Although an operation flow in which the JPEG compression is performed is almost the same as that of the foregoing run length compression, first, in step S511, parameters such as compression ratios and sub-sampling ratios in the second data compressor 115 and second data decompressor 116 are selected in accordance with the capacity or free capacity of the host memory 106 and preliminarily stored in the command memory 109.

After that, the rendering is performed by the PDL circuit 111 (step S512). The page description language is converted into the RGB dot data, the color conversion is performed by the color converter 112, and the dot data expressed by RGB is converted into the CMYK dot data (step S513).

When the conversion into the CMYK raster image data by the color converter 112 is finished as mentioned above, the command memory 109 subsequently executes compression based on the parameters set in step S511 by the second data compressor 115 (step S514).

In the above compression, although JPEG compression, as an irreversible compression, is performed color by color on the CMYK dot data by the second data compressor 115, while the JPEG compression is being executed, the command memory 109 transfers the data in the second data compressor 115 to the host memory 106 color by color and sequentially stores it into the host memory 106 (step S515). The processing routine advances to step S516 and subsequent steps.

Thus, the data produced by either the first data compressor 113 or the second data compressor 115 is stored in the host memory 106 by the comparison between the free capacity of the host memory 106 and the compressed data amount.

Subsequently, when the data is stored in the host memory 106, the color of the data to be outputted to the color copier as an image output apparatus is selected from CMYK (step S516). After that, the data (of the selected color) stored in the host memory 106 is subjected to a data decompression opposite to the compression selected upon compression by the first data decompressor 114 or second data decompressor 116 and the decompressed data is outputted from the printer I/F 117 (step S517). The above processes are repeated the number of times as many as all colors (step S518).

Figure 12:
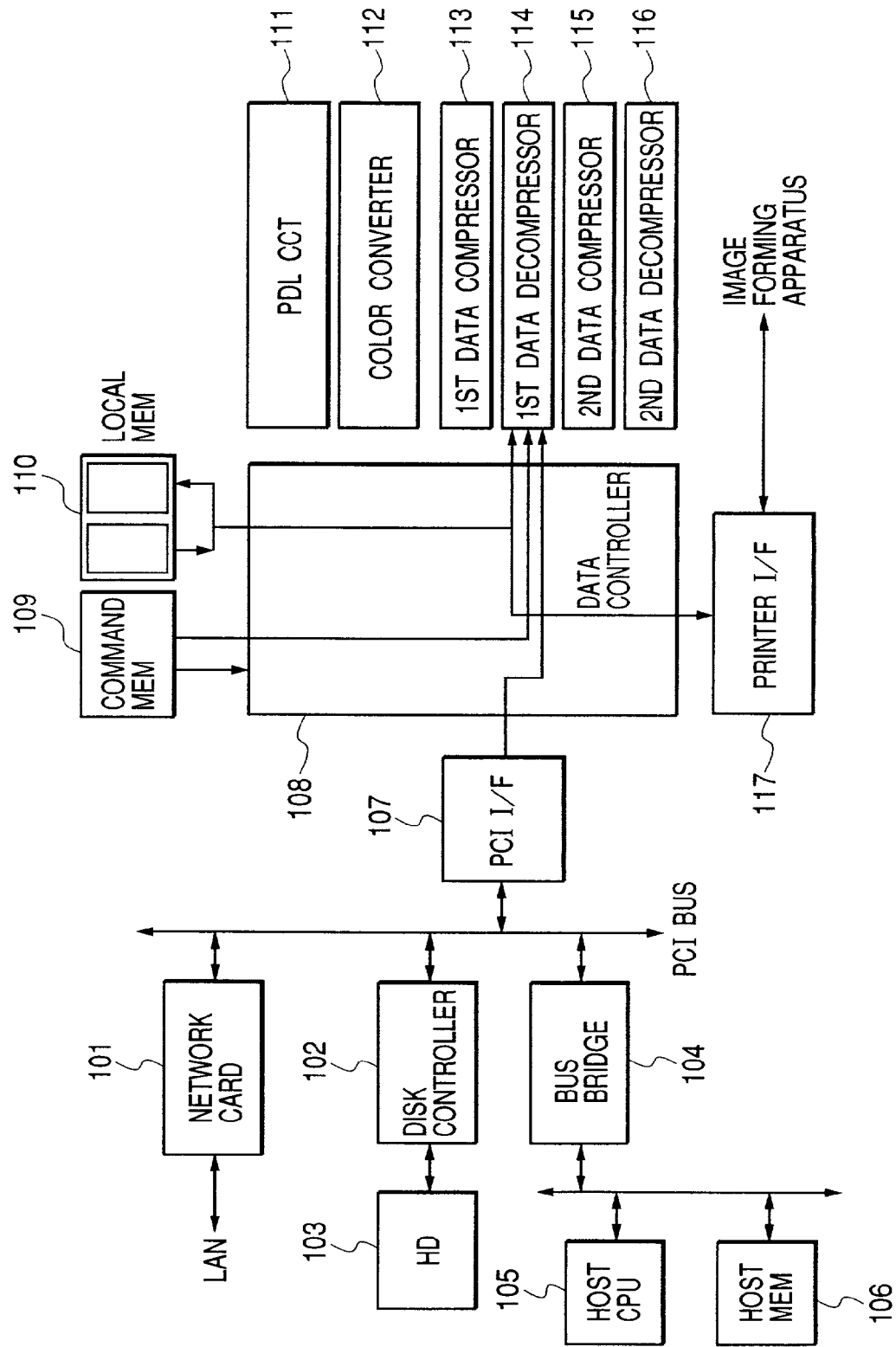
FIG. 12 is a block diagram for explaining a data processing state at each phase in the printer controller shown in FIG. 2.

FIG. 12 shows a state where the data of the color selected in step S516 is decompressed by the first data decompressor 114 and outputted to the color copier. In FIG. 12, the data controller 108 connects the PCI I/F 107 to the first data decompressor 114, the command memory 109 to the first data decompressor 114, the local memory 110 to the first data decompressor 114, and the printer I/F 117 to the first data decompressor 114 in accordance with commands which are outputted from the command memory 109, respectively.

The first data decompressor 114 obtains the compressed data of the color selected in step S516 from the host memory 106, generates the dot data, and stores it into the local memory 110 in accordance with commands and setting in the command memory 109.

The data decompression by the first data decompressor 114 is divisionally performed plural times and the capacity of the dot data that is generated at once is restricted to half or less of the memory capacity of the local memory 110.

The local memory 110 has a double buffer construction in which the memory capacity is divided into two memories. The dot data is inputted from the first data decompressor 114 to one of the two divided memories and, at the same time, the dot data stored in the local memory 110 is outputted from the other memory to the color copier through the printer I/F 117.

When the data as much as one color is outputted to the color copier by an amount of one page in step S517 as mentioned above, if the color data of all of CMYK is not outputted in accordance with a command of the command memory 109 in step S518, the processing routine is returned to step S516 and the color to be outputted is selected.

If the color data of all colors has been outputted in step S518, the printing operation is finished.

Second Embodiment

In this embodiment, JPEG compression (as an irreversible compression) is first performed color by color by the second data compressor 115 on the CMYK dot data to which the rendering process and the color conversion have been performed. While the JPEG compression is being performed, the command memory 109 transfers the data outputted from the second data compressor 115 to the host memory color by color and sequentially stores it into the host memory 106. Although the parameters for performing the JPEG compression are selected on the basis of the capacity or free capacity of the host memory 106 as mentioned above, for example, if a background includes a wide blank portion like a character image or the like in dependence on the image as a result of the actual compression, there is a case where the compression ratio is fairly higher as compared with that of a photograph original. There is, consequently, a case where the deterioration of a character image becomes conspicuous even though the host memory 106 has a surplus capacity.

To solve such a drawback, the second embodiment differs from the data processing according to the first embodiment with respect to a point that a certain threshold value is set and if the host memory 106 has a surplus capacity which is equal to or larger than the threshold value as a result of the JPEG compression, the compression is switched to run-length compression as a reversible compression technique.

Figure 13:
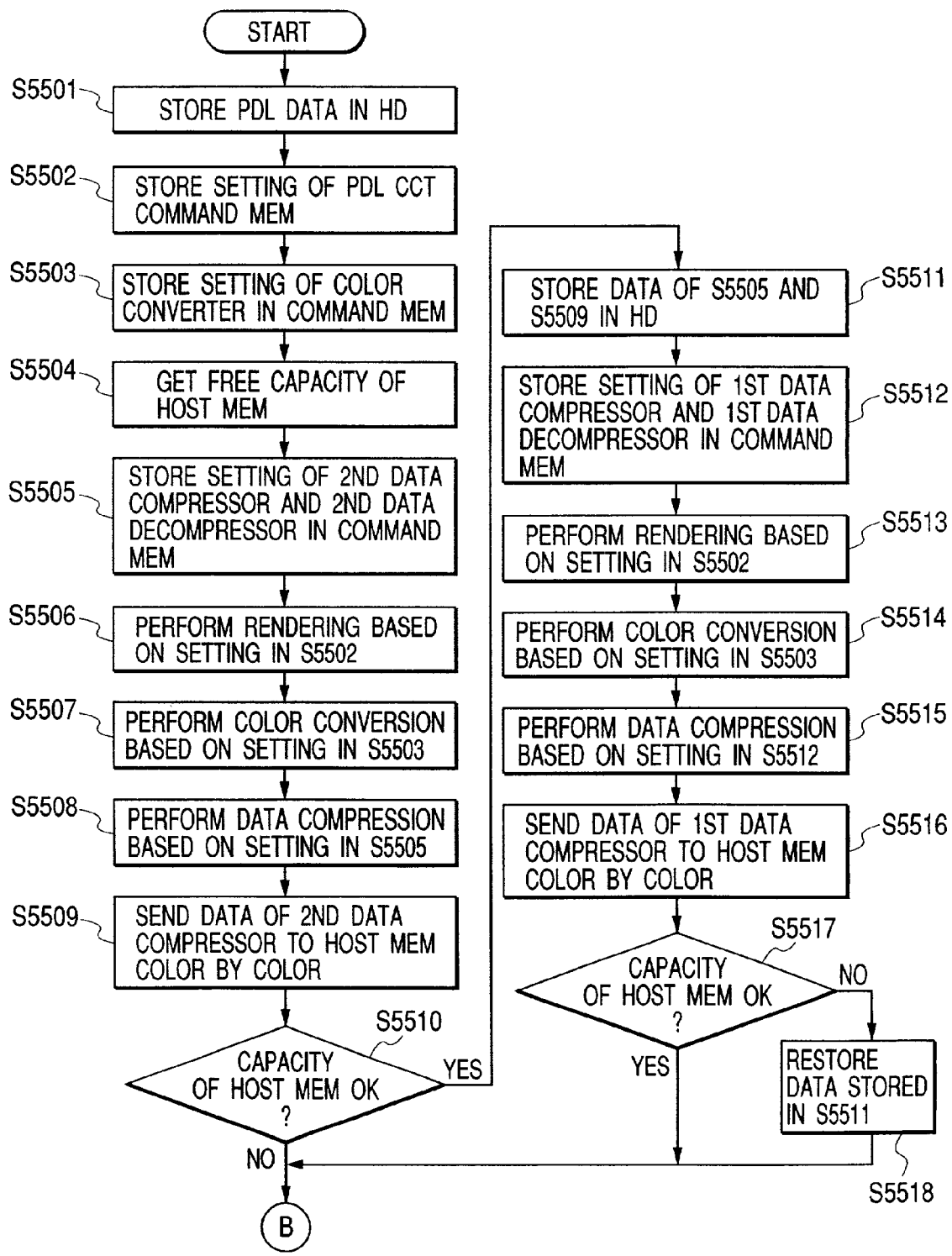
FIG. 13 is a flowchart showing an example of a second data processing procedure in the print control apparatus according to the invention.
Figure 14:
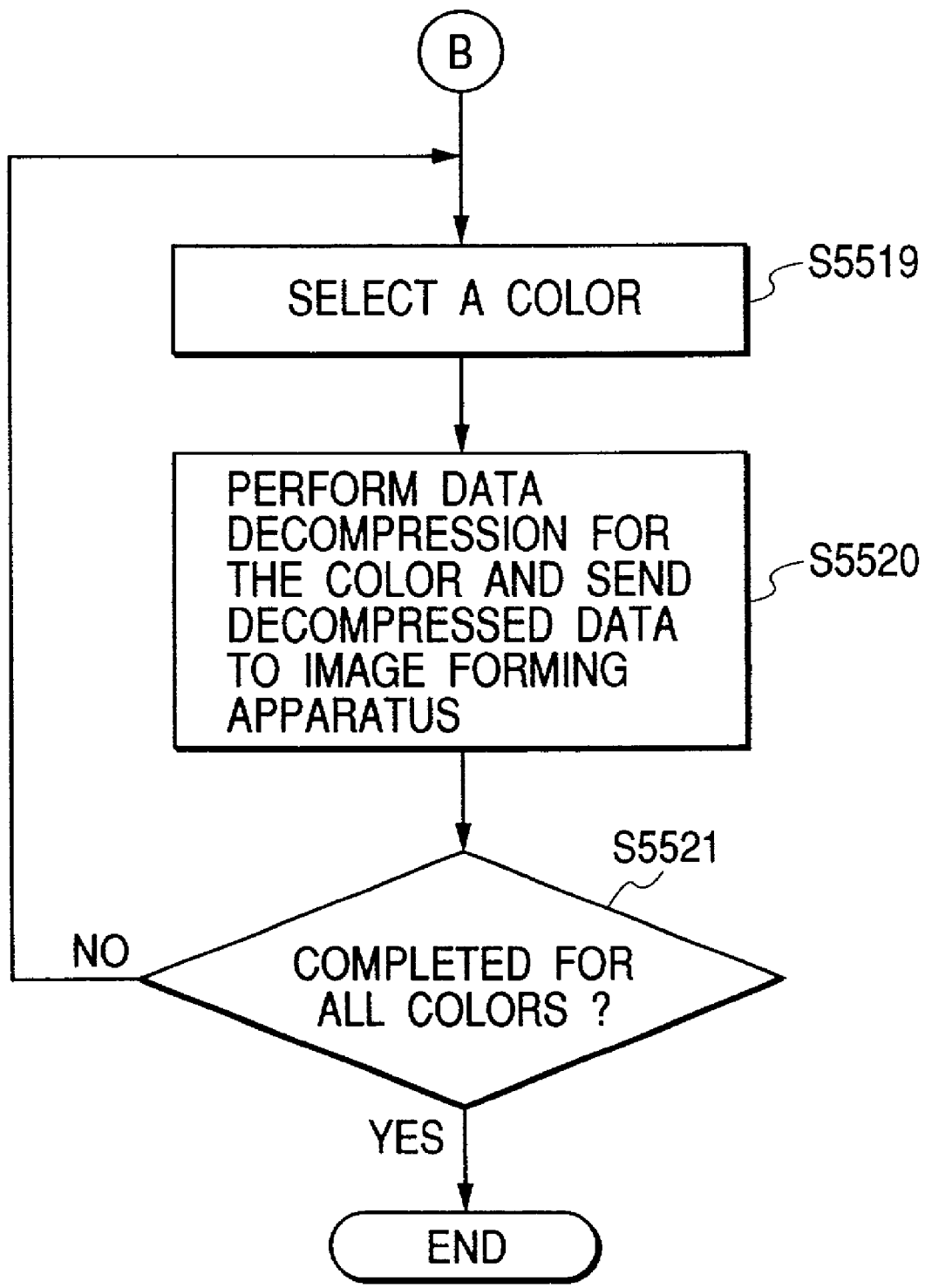
FIG. 14 is a flowchart showing an example of the second data processing procedure in the print control apparatus according to the invention.

FIGS. 13 and 14 are flowcharts showing an example for a second data processing procedure in the print control apparatus according to the invention and correspond to another data processing procedure of the host computer which is executed while the color image data of the computer 401 is printed from the color copier. S5501 to S5521 indicate processing steps. For simplicity of explanation, the printing operation for an amount of data corresponding to one page of recording paper will be described in FIGS. 13 and 14.

First, the PDL data written by the page description language is transmitted from the computer 401 to the host computer 402 through the LAN and the host computer 402 stores the transmitted PDL data into the hard disk 103 (step S5501). When the PDL data is stored in the hard disk 103 as mentioned above, the host CPU 105 stores setting for performing the rendering process by the PDL circuit 111 into the command memory 109 (step S5502) and, thereafter, similarly stores setting for performing the color conversion by the color converter 112 into the command memory 109 (step S5503).

Subsequently, the host CPU 105 obtains the free capacity of the host memory 106 (step S5504), selects the parameters such as compression ratios and sub-sampling ratios in the second data compressor 115 and second data decompressor 116 in accordance with the free capacity of the host memory 106, and stores them into the command memory 109 (step S5505).

When all of the settings and parameters for outputting the data to the color copier are set in the command memory 109, the control of each device of the printer controller 100 is started on the basis of the commands and settings stored in the command memory 109 and the rendering by the PDL circuit 111 is first performed (step S5506).

When the conversion into the RGB raster image data by the PDL circuit 111 is finished, the command memory 109 executes the color conversion by the color converter 112 (step S5507).

When the conversion into the CMYK raster image data by the color converter 112 is finished, the command memory 109 executes the compression on the basis of the parameters set in step S5505 by the second data compressor 115 (step S5508).

Subsequently, while the JPEG compression of the CMYK dot data is being performed by the second data compressor 115, the command memory 109 transfers the data from the second data compressor 115 to the host memory 106 color by color and stores it into the host memory 106 (step S5509).

Subsequently, in step S5510, whether an amount of data which is sequentially stored in the host memory 106 is sufficiently smaller than the free capacity of the host memory 106 obtained in step S5504 or not is monitored and discriminated by the host CPU 105. If it is determined that the data amount is not sufficiently smaller than the free capacity of the host memory 106, the processes in steps S5511 to S5518 are not performed but the processing routine advances to the next step.

If it is determined that the data amount is sufficiently smaller than the free capacity of the host memory 106, the processing routine is switched to the compression by the first data compressor 113 in step S5511 and subsequent steps.

First, the contents stored in steps S5505 and S5509 are stored in the hard disk 103 in step S5511. In step S5512, the settings for performing the compression and decompression of the first data compressor 113 and first data decompressor 114 are stored in the command memory 109.

After that, the rendering is performed by the PDL circuit 111 (step S5513). The page description language is converted into the RGB dot data, the color conversion is performed by the color converter 112, and the dot data expressed by RGB is converted into the CMYK dot data (step S5514).

When the conversion into the CMYK raster image data by the color converter 112 is finished as mentioned above, the command memory 109 subsequently performs the compression on the basis of the parameters set in step S5512 by the first data compressor 113 (step S5515).

In the compressing process, although the run-length compression is performed as a reversible compression is performed color by color on the CMYK dot data by the first data compressor 113, while the run-length compression is being performed, the command memory 109 transfers the data in the first data compressor 113 into the host memory 106 color by color and sequentially stores it into the host memory 106 (step S5516).

Subsequently, whether an amount of data which is obtained in step S5516 and sequentially stored in the host memory 106 does not exceed the free capacity of the host memory 106 obtained in step S5504 or not is monitored and discriminated by the host CPU 105 (step S5517). If it is determined that the data amount does not exceed the free capacity of the host memory 106, the processing routine advances to step S5519 and subsequent steps (FIG. 14).

If it is determined that the data amount exceeds the free capacity of the host memory 106, the contents stored in the hard disk 103 in step S5511 are restored in step S5518 and the processing routine advances to step S5519 and subsequent steps.

Consequently, the data from either the first data compressor 113 or the second data compressor 115 is stored in the host memory 106 based on the comparison between the free capacity of the host memory 106 and the compressed data amount.

Subsequently, when the data is stored in the host memory 106, the color of the data to be outputted to the color copier as an image output apparatus is selected from CMYK (step S5519). After that, the data (of the selected color) stored in the host memory 106 is subjected to a data decompression opposite to the compression that has been selected, and the decompressed data is outputted from the printer I/F 117 (step S5520). The above processes are performed a number of times equal to the number of color signals (step S5521).

When the data of one color is outputted to the color copier by an amount of one page in step S5520 as mentioned above, if the data of all of CMYK is not outputted in accordance with the command from the command memory 109, the processing routine is returned to step S5519, and the color to be outputted is selected.

If the data of all colors has been outputted in step S5521, the printing operation is finished.

In this embodiment, in step S5517, there is a possibility that the data amount is larger than the free capacity of the host memory 106 as a result of the run-length compression, the setting contents and the compression contents at the time when the JPEG compression has been performed are preliminarily backed up in the hard disk in step S5511. In this case, the run-length compression is stopped, and the backup contents are restored in the command memory 109 and host memory 106.

Although the two compression systems and two decompression systems have been used in the embodiments, the invention is not limited to two respective systems. A plurality of compression systems and a plurality of decompression systems can be also used. In this instance, it is sufficient to construct the apparatus in such a manner that the compression and decompression which are executed on the data that is outputted to the image forming apparatus is selected from the plurality of compression and decompression systems on the basis of the free memory capacity of the host computer.

According to this embodiment, since the host computer uses the memory as a bit map memory of the printer controller, the increase in necessary memory capacity that would otherwise be necessary, can be avoided. Further, by executing the compression on the dot data to be stored in the memory of the host computer, storing the compressed data, executing an expanding process, and thereafter, transmitting the expanded data to the color copier, the necessary memory capacity can be further reduced.

Since the selection of the different compression is determined in accordance with the memory capacity or the like of the host computer, the image deterioration due to the image compression can be improved.

A construction of data processing programs which can be read out by the image processing system to which the print control apparatus according to the invention can be applied will now be described hereinbelow with reference to a memory map shown in FIG. 15.

Figure 15:
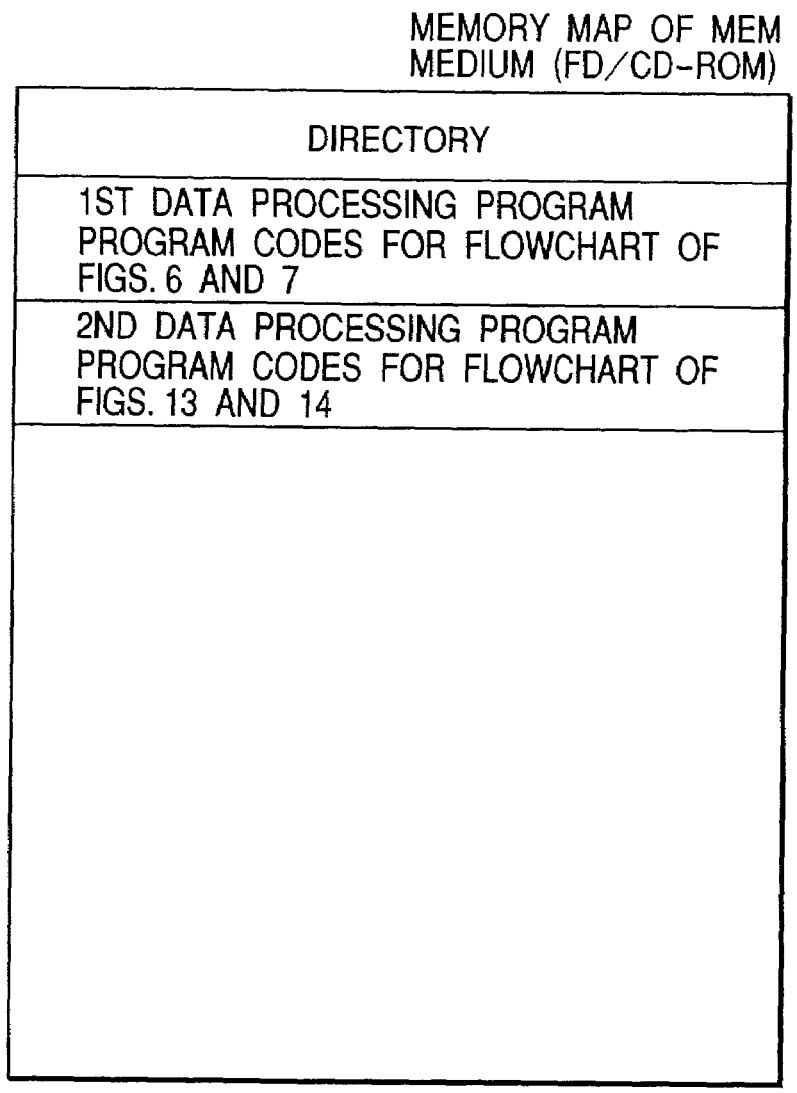
FIG. 15 is a memory map showing an example of the second data processing procedure in the print control apparatus according to the invention.
Figure 16:
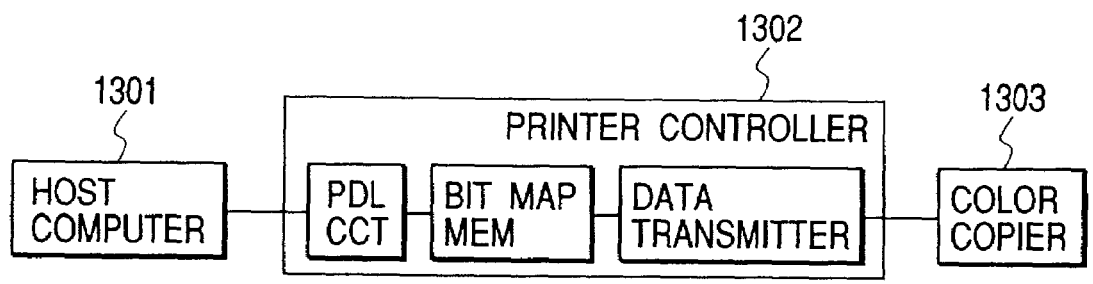
FIG. 16 is a diagram for explaining a memory map of a memory medium for storing various data processing programs which can be read out by the data processing system to which the print control apparatus according to the invention can be applied.

FIG. 15 is a diagram for explaining the memory map in a memory medium to store various data processing programs which can be read out by the image processing system to which the print control apparatus according to the invention can be applied.

Although not shown, there is also a case where information to manage the program group to be stored in the memory medium, for example, version information, implementor, and the like are also stored, and information depending on the OS or the like on the program reading side, for example, icons to identify and display the programs and the like, are also stored.

Further, data belonging to the various programs has also been managed in directories. There is also a case where a program for installing the various programs into the computer and, in the case where the installing program has been compressed, a program for decoding it, and the like, are stored.

The functions shown in FIGS. 6, 7, 13, and 14 in the embodiments described above can also be embodied by the host computer by a program which is installed from the outside. In this case, the invention is also applied to a case where an information group including the programs is supplied to the output apparatus from a memory medium such as CD-ROM, flash memory, FD, or the like or from an external memory medium through a network.

As mentioned above, the objects of the invention are also accomplished by a method whereby a memory medium in which program codes of software for realizing the functions of the embodiments mentioned above have been recorded is supplied to a system or an apparatus and a computer (or a CPU or an MPU) of the system or apparatus reads out the program codes stored in the memory medium, and executes them.

In this case, the program codes themselves read out from the memory medium realize the novel functions of the invention and the memory medium in which the program codes have been stored constructs the invention.

As a memory medium for supplying the program codes, for example, it is possible to use a floppy disk, a hard disk, an optical disk, a magnetooptic disk, a CD-ROM, a CD-R, a magnetic tape, a non-volatile memory card, an ROM, an EEPROM, or the like.

The invention naturally also incorporates not only a case where the functions of the embodiments mentioned above are realized by executing the read-out program codes by a computer but also a case where the OS (operating system) or the like which operates on the computer executes a part or all of actual processes on the basis of instructions of the program codes, and the functions of the embodiments mentioned above are realized by those processes.

Further, the invention also incorporates a case where the program codes read out from the memory medium are written in a memory equipped for a function expanding board inserted in a computer or a function expanding unit connected to a computer and, thereafter, a CPU or the like equipped for the function expanding board or function expanding unit executes a part or all of actual processes on the basis of instructions of the program codes, and the functions of the embodiments mentioned above are realized by those processes.

As described above, the second data which can be outputted from the image output apparatus is generated from the first data which is inputted from the host computer. Third data is generated by performing data compression based on a first compression format on the second data, or fourth data is generated by performing data compression based on a second compression format different from the first compression format on the second data. The system information which is obtained is analyzed. The third or fourth data is outputted to the host computer. Fifth data is generated by performing data decompression corresponding to the first compression format on the third data which is inputted from the computer, or sixth data is generated by performing data decompression corresponding to the second compression format on the fourth data which is inputted from the computer. The fifth or sixth data is outputted to the image output apparatus. Therefore, even if the data being outputted exceeds the capacity of the memory, such data is alternately stored in the memory resource of the external apparatus without the need for expanding the memory capacity. Upon outputting, the stored data can be outputted as it is as an image or can be outputted as an image with modifications. A restriction of the amount of data which can be handled is lightened, thereby avoiding a situation such that the printing process becomes difficult due to a lack of memory capacity. The print processing environment which can freely cope with the output request from the user can be established.

The compression is performed on the dot data which is stored in the memory of the host computer, the compressed data is stored, the compressed data is decompressed, and thereafter, the decompressed data is transmitted to the image output apparatus. Therefore, the necessary memory capacity can be further reduced.

Moreover, since the selection of the data compression based on the different compression format is determined in accordance with the memory capacity of the host computer or the like which is obtained, there is an effect such that the image deterioration due to the image compression can be improved or the like.

What is claimed is:

1. A print control apparatus which can communicate with a host computer and an image output apparatus, comprising:
    obtaining means for obtaining system information concerning a memory provided in said host computer, from said host computer;
    data generating means for generating second data which can be outputted from said image output apparatus from first data which is inputted from said host computer;
    first data compressing means for generating third data by performing a data compression based on a first compression format to said second data;
    second data compressing means for generating fourth data by performing a data compression based on a second compression format different from said first compression format to said second data;
    first output means for analyzing a blank capacity of said memory obtained by said obtaining means, and selectively outputting, based on said analyzing, said third data or said fourth data to said host computer;
    first data decompressing means for generating fifth data by performing a data decompression corresponding to said first compression format to said third data which is inputted from said host computer;

second data decompressing means for generating sixth data by performing a data decompression corresponding to said second compression format to said fourth data which is inputted from said host computer; and second output means for outputting said fifth or sixth data to said image output apparatus.

2. An apparatus according to claim 1, wherein said first data is code data according to a page description language.

3. An apparatus according to claim 1, wherein said second data is bit map data according to a dot format.

4. An apparatus according to claim 1, wherein said first compression format which is used in said first data compressing means is a reversible compression format, and the decompression which is executed by said first data decompressing means is a decompression to data of a format opposite to said reversible compression format.

5. An apparatus according to claim 1, wherein said first compression format which is used in said first data compressing means is a run length compression format, and the decompression which is executed by said first data decompressing means is a decompression to data of a format opposite to said run length compression format.

6. An apparatus according to claim 1, wherein said second compression format which is used in said second data compressing means is an irreversible compression format, and the decompression which is executed by said second data decompressing means is a decompression to data of a format opposite to said irreversible compression format.

7. An apparatus according to claim 1, wherein said second compression format which is used in said second data compressing means is a JPEG compression format, and the decompression which is executed by said second data decompressing means is a decompression to data of a format opposite to said JPEG compression format.

8. An apparatus according to claim 1, wherein the information, concerning the memory provided in said host computer, which is obtained by said obtaining means is a capacity of a memory which said host computer has.

9. An apparatus according to claim 1, wherein the information, concerning the memory provided in said host computer, which is obtained by said obtaining means is a free capacity in a memory which said host computer has.

10. An apparatus according to claim 1, wherein said third or fourth data which is outputted by said first output means is stored in a host memory or a hard disk which is built in said host computer.

11. An apparatus according to claim 1, wherein when the first data is color image data, said first and second data compressing means generate compression data for each color component.

12. An apparatus according to claim 1, wherein said print control apparatus and said host computer are connected by a predetermined bus interface.

13. A print control method in a print control apparatus which can communicate with a host computer and an image output apparatus, comprising:

an obtaining step of obtaining system information concerning a memory provided in said host computer, from said host computer;

a data generating step of generating second data which can be outputted from said image output apparatus from first data which is inputted from said host computer;

a first data compressing step of generating third data by performing a data compression based on a first compression format to said second data;

a second data compressing step of generating fourth data by performing a data compression based on a second compression format different from said first compression format to said second data;

a first output step of analyzing a blank capacity of said memory obtained by said obtaining step, and selectively outputting, based on said analyzing, said third data or said fourth data to said host computer;

a first data decompressing step of generating fifth data by performing a data decompression corresponding to said first compression format to said third data which is inputted from said host computer;

a second data decompressing step of generating sixth data by performing a data decompression corresponding to said second compression format to said fourth data which is inputted from said host computer; and a second output step of outputting said fifth or sixth data to said image output apparatus.

14. A method according to claim 13, wherein said first data is code data according to a page description language.

15. A method according to claim 13, wherein said second data is bit map data according to a dot format.

16. A method according to claim 13, wherein said first compression format which is used in said first data compressing step is a reversible compression format, and the decompression which is executed in said first data decompressing step is a decompression to data of a format opposite to said reversible compression format.

17. A method according to claim 13, wherein said first compression format which is used in said first data compressing step is a run length compression format, and the decompression which is executed in said first data decompressing step is a decompression to data of a format opposite to said run length compression format.

18. A method according to claim 13, wherein said second compression format which is used in said second data compressing step is an irreversible compression format, and the decompression which is executed in said second data decompressing step is a decompression to data of a format opposite to said irreversible compression format.

19. A method according to claim 13, wherein said second compression format which is used in said second data compressing step is a JPEG compression format, and the decompression which is executed in said second data decompressing step is a decompression to data of a format opposite to said JPEG compression format.

20. A method according to claim 13, wherein the information, concerning the memory provided in said host computer, which is obtained by said obtaining step is a capacity of a memory which said host computer has.

21. A method according to claim 13, wherein the information, concerning the memory provided in said host computer, which is obtained by said obtaining step is a free capacity in a memory which said host computer has.

22. A method according to claim 13, wherein said third or fourth data which is outputted by said first output step is stored in a host memory or a hard disk which is built in said host computer.

23. A computer-readable memory medium which records a program for allowing a print control apparatus which can communicate with a host computer and an image output apparatus to execute said program, wherein said program comprises:

an obtaining step of obtaining system information concerning a memory provided in said host computer, from said host computer;

a data generating step of generating second data which can be outputted from said image output apparatus from first data which is inputted from said host computer;

a first data compressing step of generating third data by performing a data compression based on a first compression format to said second data;

a second data compressing step of generating fourth data by performing a data compression based on a second compression format different from said first compression format to said second data;

a first output step of analyzing a blank capacity of said memory obtained by said obtaining step, and selectively outputting, based on said analyzing, said third data or said fourth data to said host computer;

a first data decompressing step of generating fifth data by performing a data decompression corresponding to said first compression format to said third data which is inputted from said host computer;

a second data decompressing step of generating sixth data by performing a data decompression corresponding to said second compression format to said fourth data which is inputted from said host computer; and a second output step of outputting said fifth or sixth data to said image output apparatus.

24. A medium according to claim 23, wherein said first data is code data according to a page description language.

25. A medium according to claim 23, wherein said second data is bit map data according to a dot format.

26. A medium according to claim 23, wherein said first compression format which is used in said first data compressing step is a reversible compression format, and the decompression which is executed in said first data decompressing step is a decompression to data of a format opposite to said reversible compression format.

27. A medium according to claim 23, wherein said first compression format which is used in said first data compressing step is a run length compression format, and the decompression which is executed in said first data decompressing step is a decompression to data of a format opposite to said run length compression format.

28. A medium according to claim 23, wherein said second compression format which is used in said second data compressing step is an irreversible compression format, and the decompression which is executed in said second data decompressing step is a decompression to data of a format opposite to said irreversible compression format.

29. A medium according to claim 23, wherein said second compression format which is used in said second data compressing step is a JPEG compression format, and the decompression which is executed in said second data decompressing step is a decompression to data of a format opposite to said JPEG compression format.

30. A medium according to claim 23, wherein the information, concerning the memory provided in said host computer, which is obtained by said obtaining step is a capacity of a memory which said host computer has.

31. A medium according to claim 23, wherein the information, concerning the memory provided in said host computer, which is obtained by said obtaining step is a free capacity in a memory which said host computer has.

32. A medium according to claim 23, wherein said third or fourth data which is outputted by said first output step is stored in a host memory or a hard disk which is built in said host computer.

* * * * *